United States Patent
Krig

(10) Patent No.: US 8,069,291 B2
(45) Date of Patent: *Nov. 29, 2011

(54) METHOD AND COMPUTER PROGRAM PRODUCT FOR EVENT DETECTION

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/782,444

(22) Filed: May 18, 2010

(65) Prior Publication Data

US 2010/0229049 A1    Sep. 9, 2010

Related U.S. Application Data

(63) Continuation of application No. 11/905,949, filed on Oct. 5, 2007, now Pat. No. 7,725,636.

(60) Provisional application No. 60/918,062, filed on Mar. 15, 2007.

(51) Int. Cl.
*G06F 13/00* (2006.01)

(52) U.S. Cl. .............. 710/262; 710/48; 714/37; 714/48; 714/819

(58) Field of Classification Search .............. 710/48, 710/49, 260–269; 714/37, 48, 819
See application file for complete search history.

(56) References Cited

U.S. PATENT DOCUMENTS

| | | | |
|---|---|---|---|
| 4,658,351 A | 4/1987 | Teng | |
| 4,847,877 A | 7/1989 | Besseyre | |
| 5,418,744 A | 5/1995 | Taoda | |
| 5,526,283 A | 6/1996 | Hershey et al. | |
| 6,282,173 B1 | 8/2001 | Isonuma et al. | |
| 6,307,565 B1 | 10/2001 | Quirk et al. | |
| 6,856,600 B1 | 2/2005 | Russell et al. | |
| 7,307,863 B2 | 12/2007 | Yen et al. | |
| 7,480,839 B2 | 1/2009 | Smith et al. | |
| 7,484,028 B2 | 1/2009 | Raju et al. | |
| 7,493,408 B2 | 2/2009 | Chang et al. | |
| 7,536,615 B1 | 5/2009 | Pierce et al. | |
| 7,546,424 B1 | 6/2009 | May et al. | |
| 7,725,636 B2 | 5/2010 | Krig | |
| 2003/0009307 A1 | 1/2003 | Mejia et al. | |
| 2003/0065829 A1 | 4/2003 | Rasmussen et al. | |
| 2004/0066765 A1 | 4/2004 | Segal et al. | |
| 2005/0060461 A1 | 3/2005 | Yang | |
| 2005/0198537 A1 | 9/2005 | Rojewski | |

(Continued)

FOREIGN PATENT DOCUMENTS

WO    WO 2004/077266 A2    9/2004

OTHER PUBLICATIONS

Non-Final Rejection mailed Sep. 14, 2010, for U.S. Appl. No. 11/905,948, filed Oct. 5, 2007, 20 pgs.

(Continued)

*Primary Examiner* — Glenn A Auve
(74) *Attorney, Agent, or Firm* — Sterne, Kessler, Goldstein & Fox PLLC

(57) ABSTRACT

A method to detect an event between a data source and a data sink using a trigger core is described herein. The method comprises monitoring control lines and an associated data stream for a programmable pattern, wherein the pattern is one or more of a condition, state or event. The method further comprises generating an indication by updating a status register, sending an interrupt or asserting a control line upon a pattern match.

20 Claims, 22 Drawing Sheets

U.S. PATENT DOCUMENTS

| | | | |
|---|---|---|---|
| 2006/0161984 | A1 | 7/2006 | Phillips et al. |
| 2006/0190630 | A1 | 8/2006 | Sandorfi |
| 2007/0143521 | A1 | 6/2007 | Raju et al. |
| 2007/0180173 | A1 | 8/2007 | Jin et al. |
| 2007/0226549 | A1 | 9/2007 | Anastasiadis et al. |
| 2008/0062899 | A1 | 3/2008 | Huang et al. |
| 2008/0071904 | A1 | 3/2008 | Schuba et al. |
| 2008/0094986 | A1 | 4/2008 | Coene |
| 2008/0228896 | A1 | 9/2008 | Krig |
| 2008/0228967 | A1 | 9/2008 | Krig |
| 2008/0228979 | A1 | 9/2008 | Krig |
| 2008/0229044 | A1 | 9/2008 | Krig |
| 2008/0260263 | A1 | 10/2008 | Metcalfe et al. |
| 2008/0270143 | A1 | 10/2008 | Metz |

OTHER PUBLICATIONS

Non-Final Rejection mailed Oct. 28, 2010, for U.S. Appl. No. 11/905,953, filed Oct. 5, 2007, 16 pgs.

"Media Transfer Protocol Enhanced", Microsoft Corporation, Revision 0.96, Aug. 31, 2006, 258 pgs.

Final Rejection mailed Jan. 6, 2010 for U.S. Appl. No. 11/905,953, 28 pgs.

Non-Final Rejection mailed Apr. 27, 2009 for U.S. Appl. No. 11/905,949, 8 pgs.

Non-Final Rejection mailed Apr. 28, 2009 for U.S. Appl. No. 11/905,953, 27 pgs.

Non-Final Rejection mailed Oct. 8, 2009 for U.S. Appl. No. 11/905,949, 7 pgs.

Krig, Scott, "Software Driver interconnect Framework", U.S. Appl. No. 11/905,953, filed Oct. 5, 2007.

Krig, Scott, "Trigger Core", U.S. Appl. No. 11/905,949, filed Oct. 5, 2007.

Krig, Scott, "Pipelined Buffer Interconnect Fabric", U.S. Appl. No. 11/905,948, filed Oct. 5, 2007.

Krig, Scott, "Pipelined Buffer Interconnect with Trigger Core Controller", U.S. Appl. No. 11/905,954, filed Oct. 5, 2007.

Non-Final Rejection mailed Jun. 24, 2010 for U.S. Appl. No. 11/905,954, 8 pgs.

Joo, Y., et al., "Doubling Memory Bandwidth for Network Buffers", Infocom, 1998; 8 pages.

Notice of Allowance mailed Mar. 25, 2011, for U.S. Appl. No. 11/905,954, filed Oct. 5, 2007; 7 pages.

Final Rejection mailed Mar. 30, 2011, for U.S. Appl. No. 11/905,948, filed Oct. 5, 2007; 23 pages.

Final Rejection mailed May 6, 2011, for U.S. Appl. No. 11/905,953, filed Oct. 5, 2007; 16 pages.

METHOD AND COMPUTER PROGRAM PRODUCT FOR EVENT DETECTION

CROSS-REFERENCE TO RELATED APPLICATIONS

This application is a continuation of U.S. patent application Ser. No. 11/905,949 filed on Oct. 5, 2007, which claims the benefit of U.S. Provisional Application No. 60/918,062 filed on Mar. 15, 2007, both of which are incorporated herein by reference in their entirety.

BACKGROUND OF THE INVENTION

1. Field of the Invention

The present invention generally relates to methods and systems for data transfer.

2. Background Art

Conventionally, data transfers in computational devices are initiated and managed by an application running on a processor. These data transfers consume processor bandwidth. These data transfers also slow because bus arbitration over a congested system bus may have to be performed for each data transfer. Direct Memory Access (DMA) engines also use the system bus and are unable to overcome this deficiency. Furthermore, DMA engines are limited to data transfers between main memory and hard disk drives.

Furthermore, errors during data transfer may not be detected until the end of a data transfer when an error checking mechanism such as a cyclic redundancy check (CRC) is used. Furthermore mechanisms do no exist to detect real time patterns in data being transferred.

Methods and systems are needed to overcome the above mentioned deficiencies.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 19A:
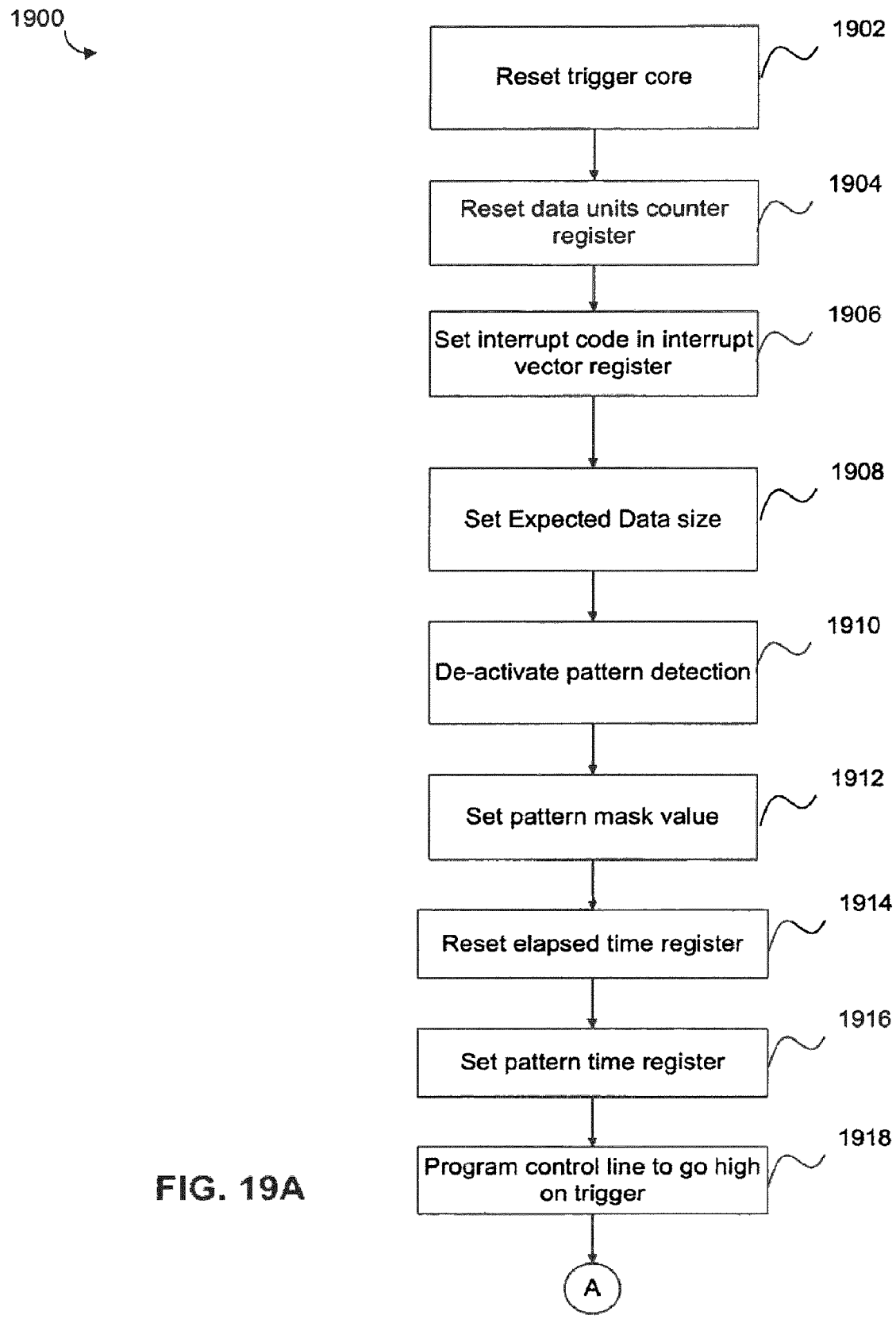
Figure 19B:
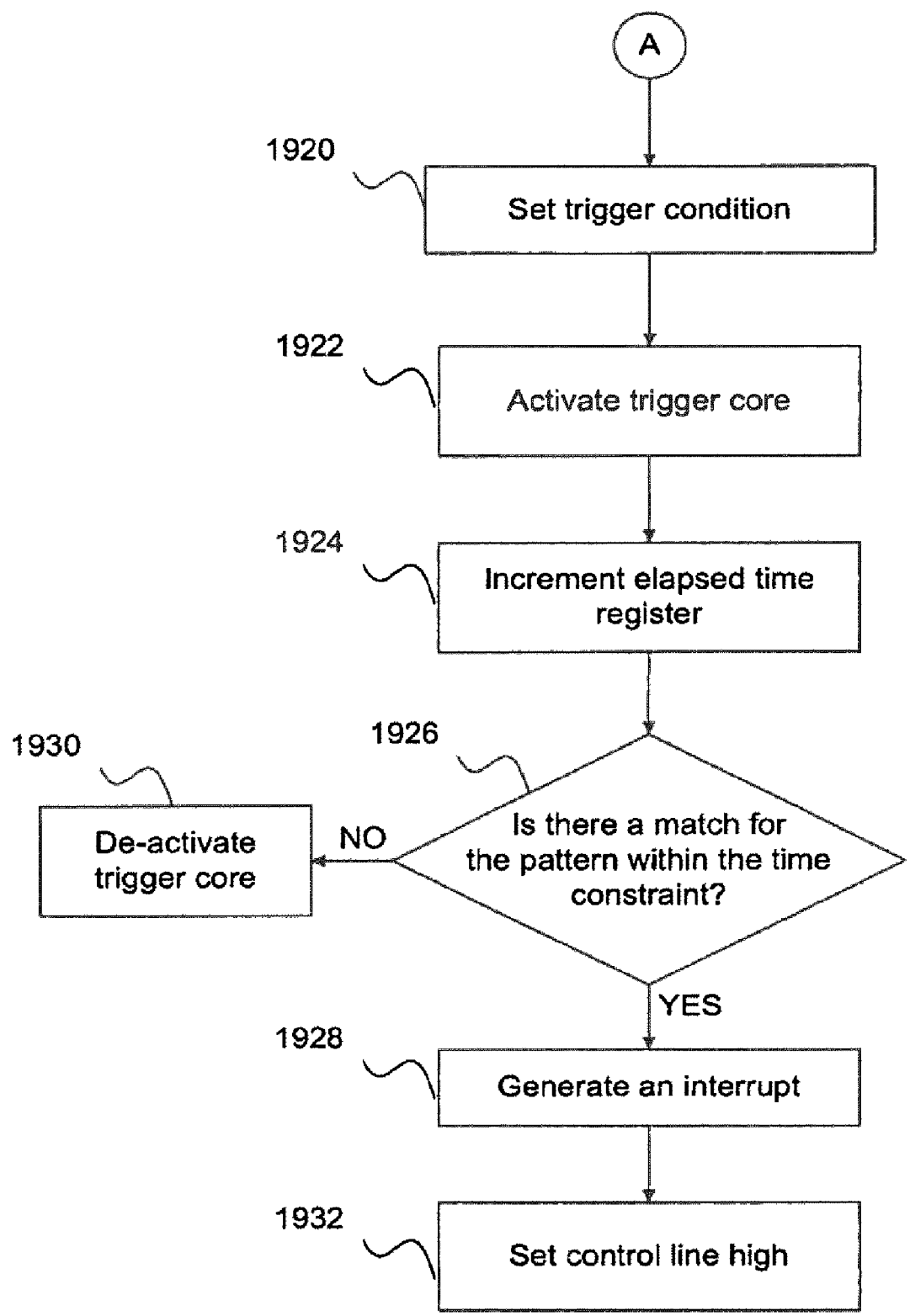

FIGS. 19A-B illustrate a flowchart showing steps to detect a pattern within a predetermined time period according to an embodiment of the invention.

Figure 20A:
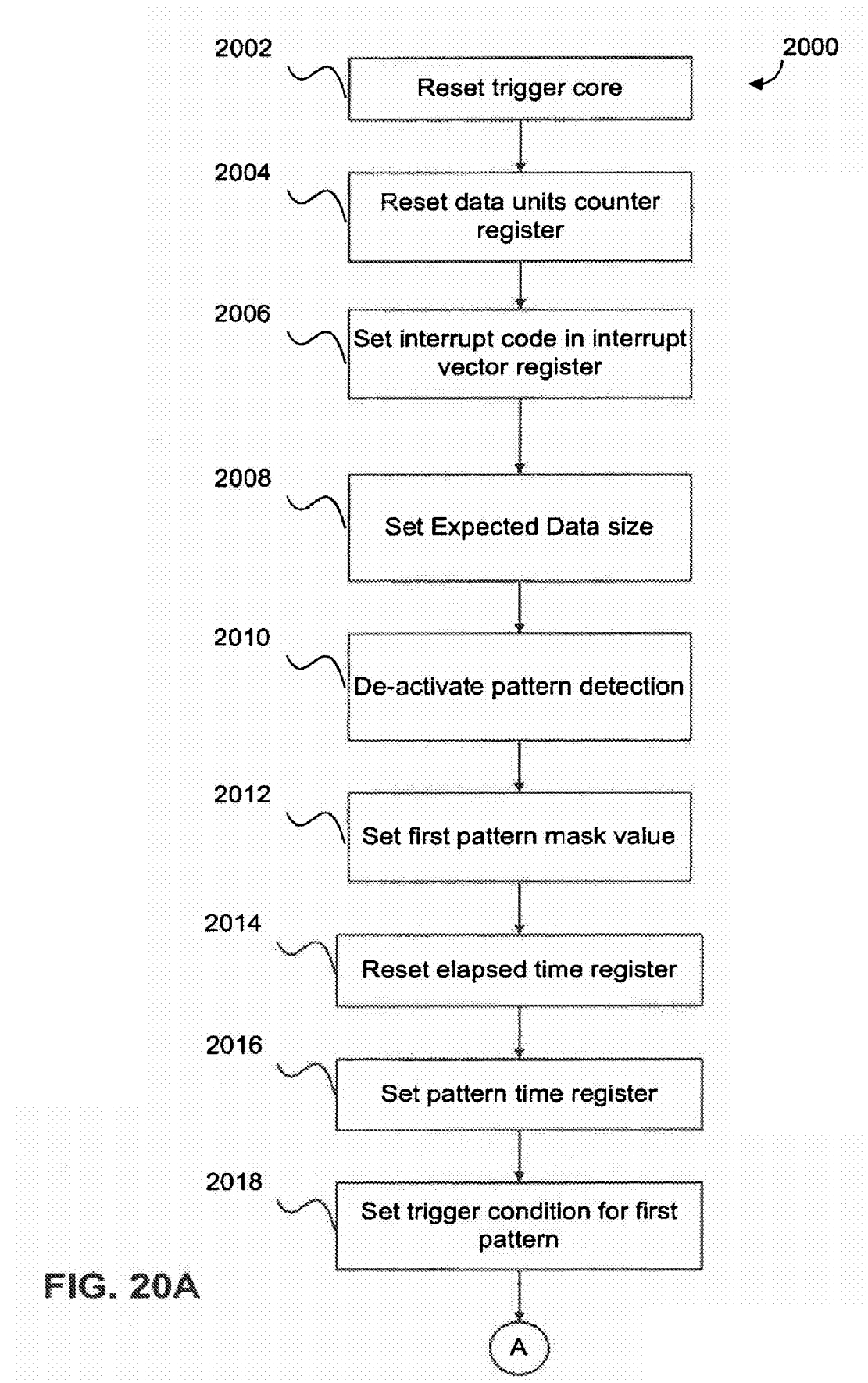
Figure 20B:
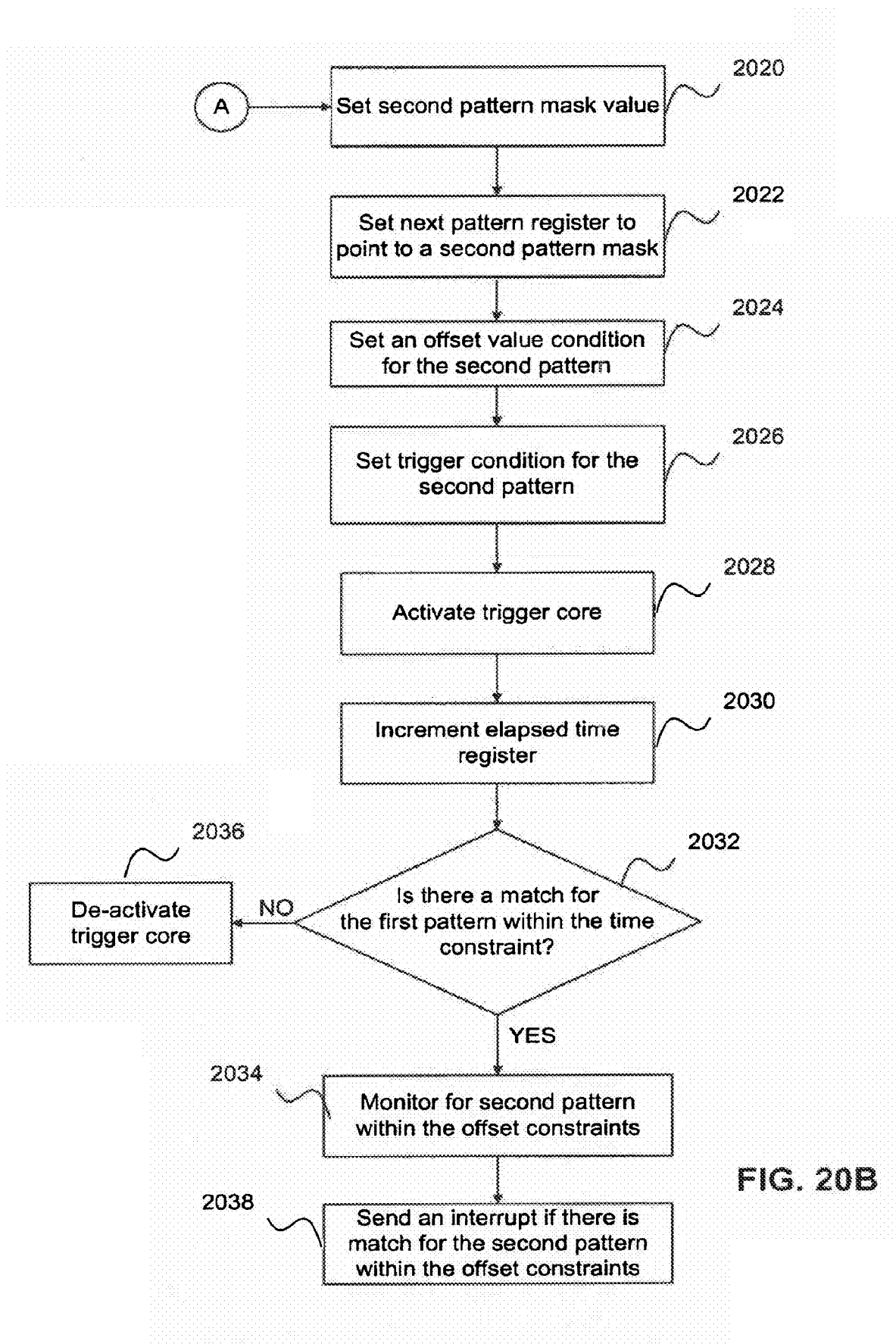

FIGS. 20A-B illustrate a flowchart showing steps to detect multiple patterns according to an embodiment of the invention.

Figure 21:
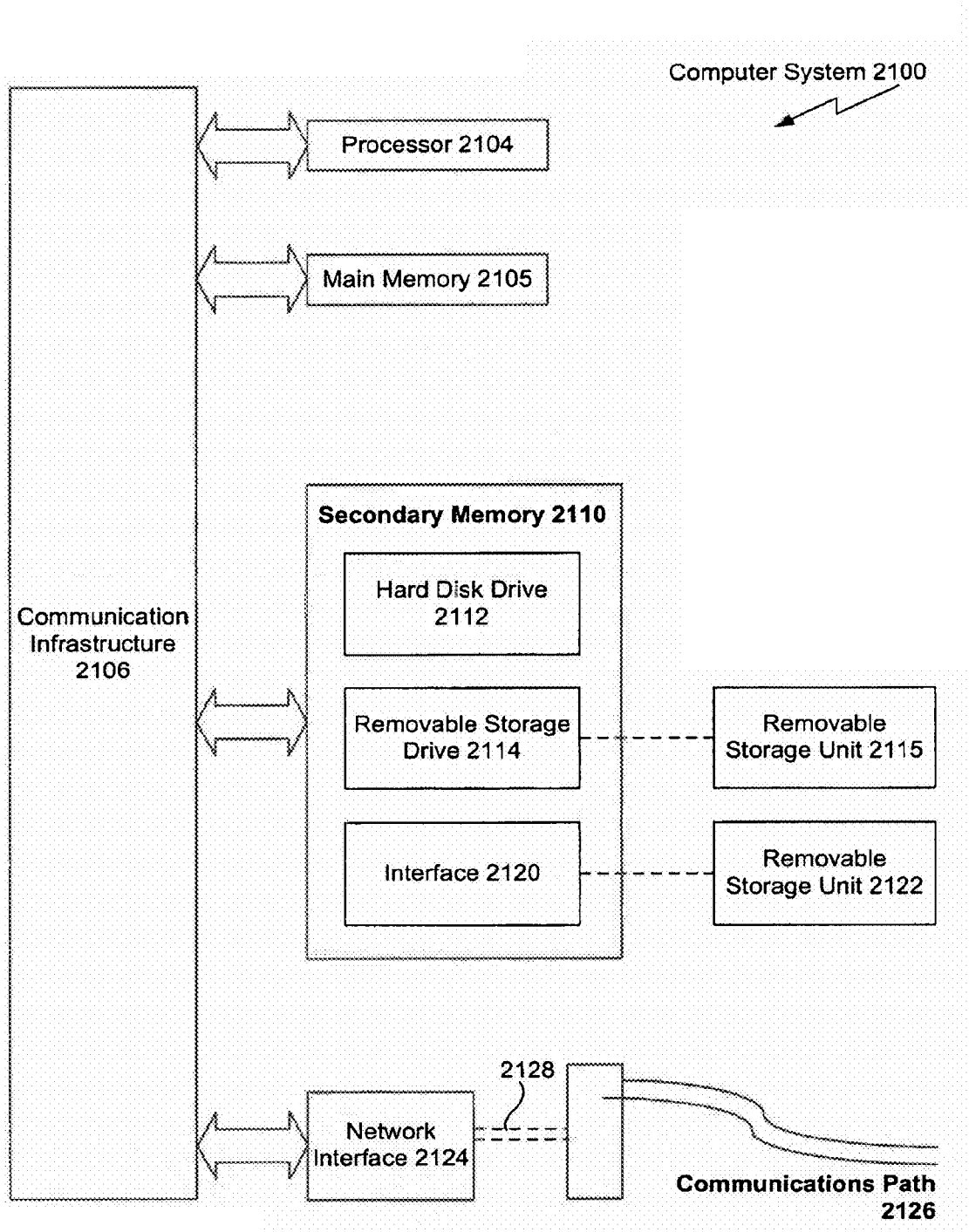

FIG. 21 is a block diagram of a computer system on which the present invention can be implemented.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

1. Overview
2. Example Operating Environment
3a. Pipelined Buffer Interconnect
   3b. Adapters, memory interfaces and connectors
4a. Example Device Driver Operational Environment
   4b. Software Interconnect Drivers
5. Trigger Core
6. Trigger Core Interfaced with Pipelined Buffer Interconnect
7. Example General Purpose Computer System
8. Conclusion

1. Overview

The present invention provides apparatus and methods for pipelining data transfer between a data source and a data sink using dedicated buffers and buses in a pipelined buffer interconnect fabric. In an embodiment, adapters are provided to interface the data sources and data sinks with the pipelined buffer interconnect.

In another aspect of the invention, software drivers facilitate the transfer of data from the data source to the data sink using available buffers and buses. In an embodiment, software drivers control the pipelined buffer interconnect to transfer data between the data source and data sink.

Embodiments presented herein also provide a trigger core to monitor a data stream from a data source to a data sink for a pattern or sequence of patterns and to trigger events upon detecting the one or more patterns. In an embodiment, a trigger core may also control the pipelined buffer interconnect to transfer data from the data source to the data sink.

In the detailed description of the invention that follows, references to "one embodiment", "an embodiment", "an example embodiment", etc., indicate that the embodiment described may include a particular feature, structure, or characteristic, but every embodiment may not, necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

2. Example Operating Environment

Figure 1:
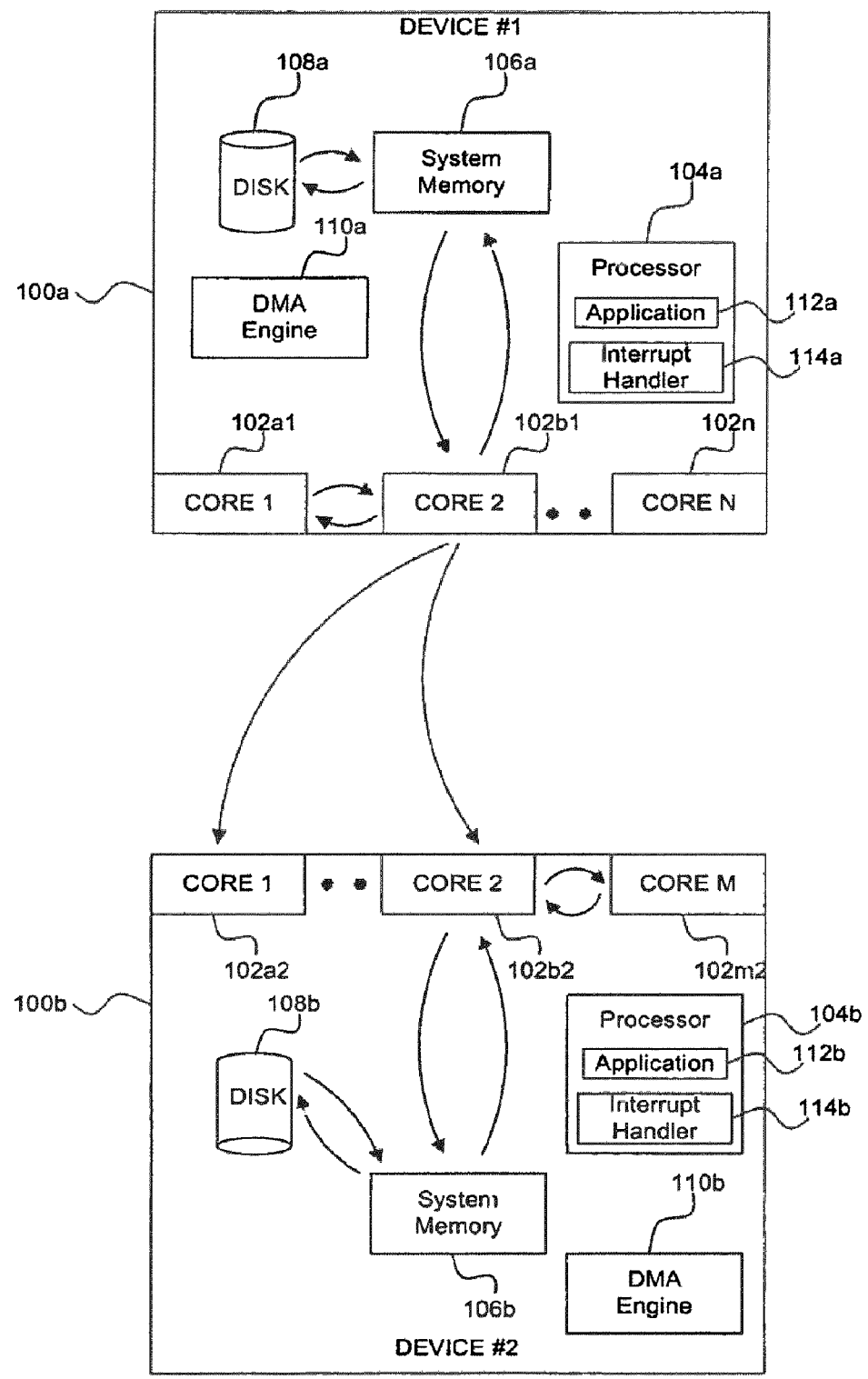
FIG. 1 illustrates example data transfers between data sources and data sinks.

FIG. 1 illustrates example data transfers between data sources and data sinks. Device 1 100a and device 2 100b may be any computational device including but not limited to hand held computing devices, personal computers, MP3 players, media players, digital appliances and cellular phones. For example, device 1001a may be a laptop computer and device 100b may be a portable media player. Device 100a includes N cores 102a1-102n1, processor 104a which runs application 112a and interrupt handler 114a, system memory 106a, disk drive 108a, direct memory access (DMA) engine 110a. Device 100b includes M cores, 102a2-102m2, processor 104b which runs application 112b and interrupt handler 114b, direct memory access engine 110b, system memory 106b and disk drive 108b.

A data source as described herein is an initiator of data transfer or source of data. A data sink as described herein is a recipient of data from the data source. Cores 102, system memory 106 and disk drive 108 may be a data source or a data sink. A core is typically a general purpose logic function that is used as a building block in a chip design. It is to be appreciated that cores 102 may be any applicable data transport, communications protocol or memory device including but not limited to microprocessors, microcontrollers, Digital Signal Processors (DSPs), Universal Serial Bus (USB), Wireless Fidelity (WiFi), Bluetooth, Transport Control Protocol/Internet Protocol (TCP/IP), Infrared Data Association (IrDA), Ethernet, memory cards such as Synchronous Dynamic (SD) memory cards, virtual memory, Random Access Memory (RAM), Read Only Memory (ROM), Compact Disk Drive, Digital Video Disk Drive and Blue Ray Disk drive. Cores 102 may be developed internally by a chip manufacturer or may be purchased from a third party intellectual property vendor.

Conventionally, data transfers from data sources to data sinks are initiated and managed by, for example, application 112 running on processor 104, by direct memory access engine 110 or by the source itself. Direct memory access engine 110 typically manages data transfers only between system memory 106 and disk drive 108. In an example, core 102a1 (e.g. a WiFi port) may be a data source that sends data to core 102b1 (e.g. a USB port data sink). In another example, core 102b1 may be a data source and system memory 106a may be a data sink. In yet another example, system memory 106a1 may be the data source and may transfer data to core 102b1 which may be the data sink. Data transfer may also take place from disk 108a1 which acts as a data source to system memory 106a1 which acts as data sink. Similar source and sink transfers may take place in device 2 100b between, for example, from core 2 102b2 (data source) to core M 102m2 (data sink), between core 2 102b2 (data source) and system memory 106b (data sink). Data may also be transferred from a data source in device 1 100a and a data sink in device 2 100b and vice versa. For example, data may be transferred from core 102b1 (data source) in device 100a to core 102a2 (e.g. a USB port data sink) and/or simultaneously to core 102b2 (e.g. another USB port data sink) in device 100b.

Interrupt handler 114 also known as an interrupt service routine is a call back sub-routine in an operating system or device driver whose execution is triggered by the reception of an interrupt. Interrupt handler 114 runs on processor 104.

Figure 2:
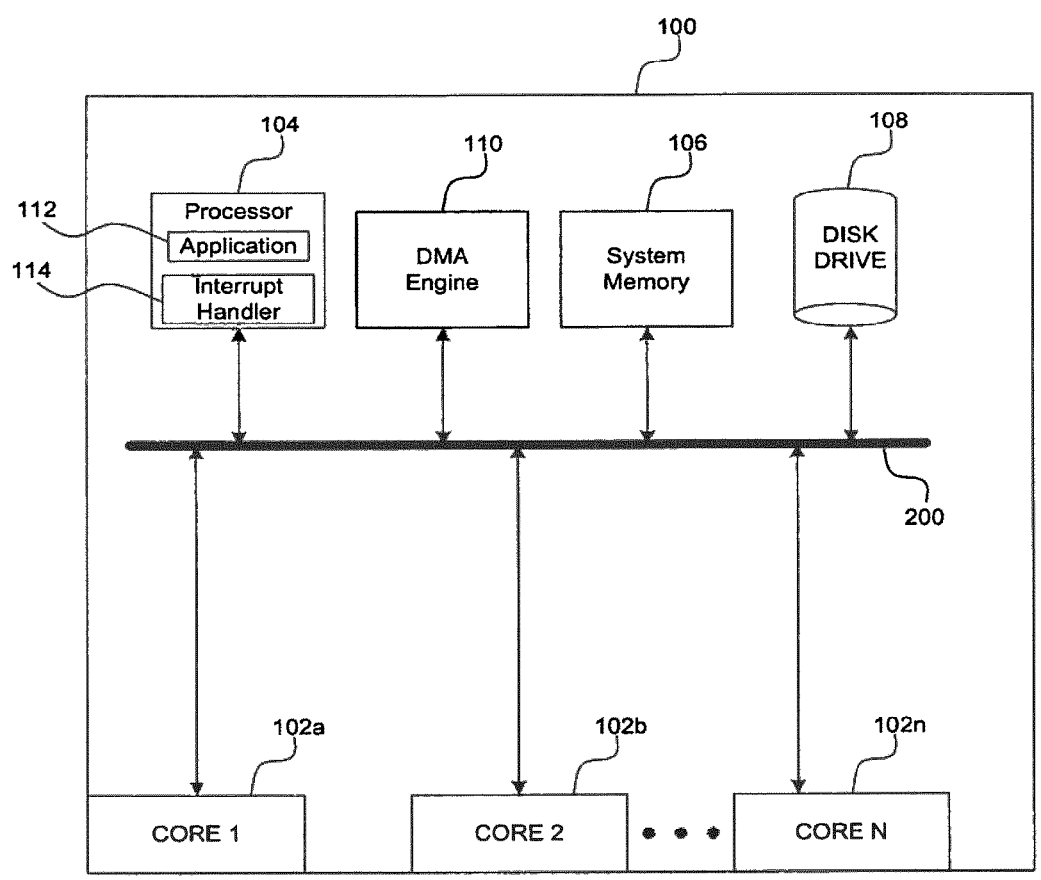
FIG. 2 illustrates conventional data transfer between data sources and data sinks using a system bus.

FIG. 2 illustrates conventional data transfer between data sources and data sinks using a system bus.

Device 100 includes processor 104, direct memory access engine 110, system memory 106, disk drive 108, N cores 102a-n coupled via system bus 200. System bus 200 is conventionally referred to as a front-side bus. In alternate embodiments, bus 200 may be a backside bus or peripheral bus. Data sources transfer data to data sinks via system bus 200. Data transfers are usually initiated by application 112 running on processor 104, DMA engine 110 or by a data source or data sink. For example, if core 102a (data source) needs to transfer data to core 102n (data sink), core 102a has to request application 112 to initiate the data transfer between core 102a and core 102n. To setup the data transfer between core 102a and core 102n, application 112 has to contend for bus 200 and reserve a data transfer slot for core 102a to transfer data to core 102n. Bus contention requires time consuming scheduling which also utilizes processor 104 bandwidth. Bus contention on bus 200 also increases the latency of data transfer between a data source and a data sink. Data transfers initiated by direct memory access engine 110 between any of cores 102 system memory 106 and/or disk drive 108 still involves bus contention on bus 200 which is a bottleneck for data transfer rates. Embodiments presented below circumvent bus contention on system bus 200, pipeline the data transfer between data sources and sinks and also minimize use of processor 104 bandwidth.

3a. Pipelined Buffer Interconnect

Figure 3:
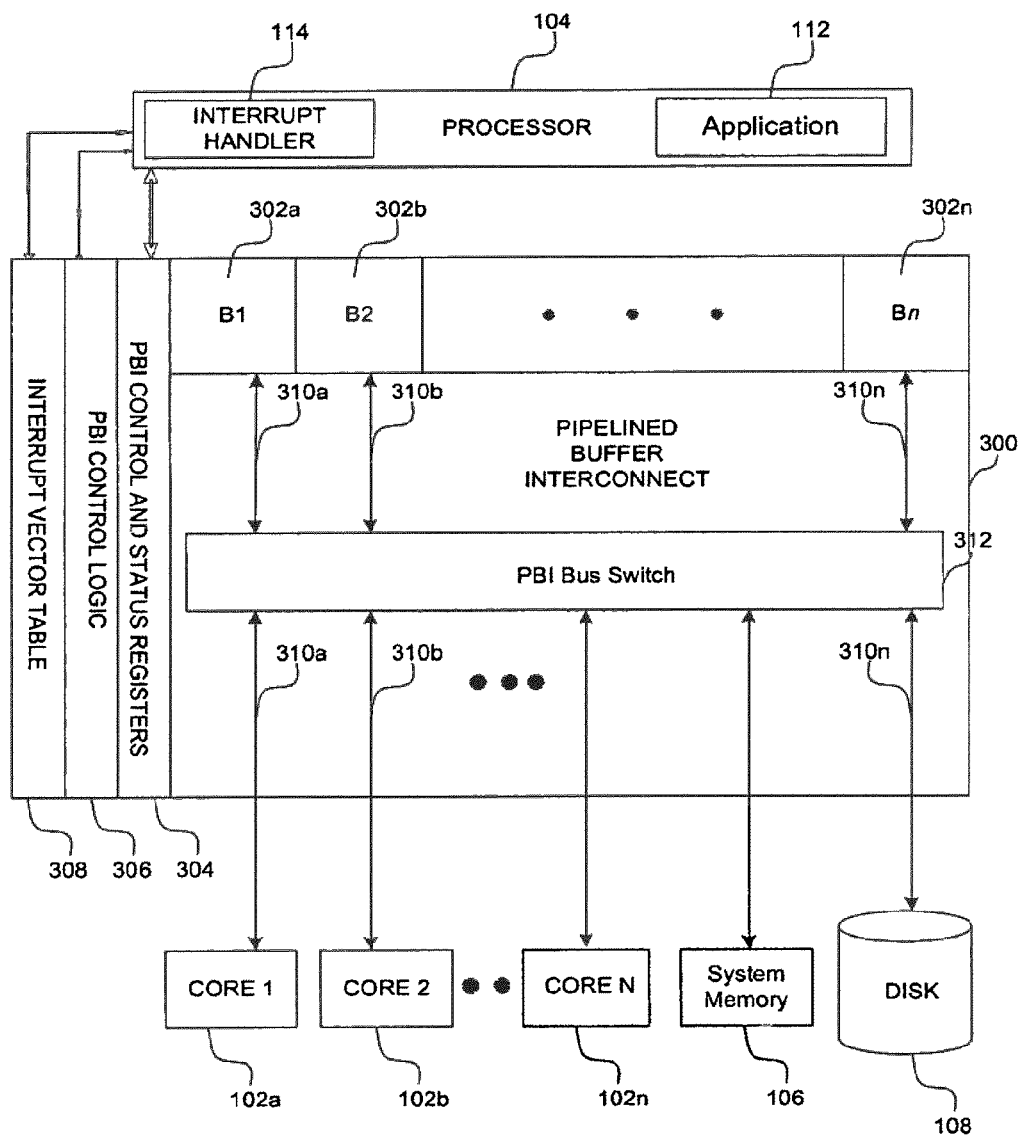
FIG. 3 illustrates an exemplary pipelined buffer interconnect according to an embodiment of the invention.

FIG. 3 illustrates an exemplary pipelined buffer interconnect (PBI) 300 according to an embodiment of the invention.

Pipelined buffer interconnect 300 comprises N buffers 302a-n, N dedicated PBI buses 310a-n, bus switch 312, PBI control and status registers 304, PBI control logic 306 and PBI interrupt vector table 308.

Pipelined buffer interconnect 300 is coupled to cores 102, disk drive 108 and system memory 106. Pipelined buffer interconnect 300 is also coupled to processor 104 which runs application 112 and interrupt handler 114. Cores 102a-n, disk drive 108 and system memory 106 are coupled to buffers 302 via PBI buses 310. Processor 104 is also coupled to pipeline buffer interconnect 300.

Pipelined buffer interconnect 300 optimizes data transfers between one or more data sources and one or more data sinks, for example, between peripherals such as Input/Output (I/O) devices, storage media and data transfers between peripherals and/or using protocols including but not limited to Universal Serial Bus (USB), Media Transport Protocol (MTP), Transmission Control Protocol (TCP)/Internet Protocol (IP) or just a simple data transfer. Pipelined buffer interconnect 300 allows data from a data source to be loaded into a dedicated buffer via a dedicated bus and then read out of the buffer by a data sink using a dedicated bus thereby eliminating contention for the system bus and multiple buffer copy operations which would otherwise be required in conventional systems to move data between a data source and a data sink.

Upon receiving a request for data transfer from a data source (e.g. core 102*b*) to a data sink (e.g. core 102*n*), pipeline buffer interconnect control logic 306 is configured to assign a first buffer (e.g. buffer 102*a*) and a first bus (e.g. bus 310*a*) to the data source. The request for data transfer from a data source to a data sink is typically initiated by the application 112 or the driver of the data source. Application 112 or the driver running on processor 104 in turn requests pipeline buffer interconnect 300 to transfer data from the data source to the data sink. The first buffer may be assigned to the data source by writing to a control register in PBI control and status registers 304 associated with the first buffer. The first bus may be assigned to the data source and locked by PBI control logic 306 using PBI bus switch 312. Alternatively, the first bus may be assigned to the data source by writing to a control register in PBI control and status registers 304 associated with the first bus. Locking the first buffer and the first bus allows only the data source to use the first buffer and the first bus while the data source is associated with them.

Upon receiving a signal from the data source of completion of data transfer to the first buffer the pipelined buffer interconnect control logic 306 is enabled to unlock the first buffer and the first bus and assign the first buffer and the first bus to the data sink. Pipelined buffer interconnect control logic 306 also assigns a second buffer (e.g. buffer 302*c*) and a second bus (e.g. bus 310*c*) to the data source if there is more data to be transferred. While the data sink reads data from the first buffer via the first bus, the data source simultaneously transfers data to the second buffer via the second bus. This process continues until the required amount of data is transferred from the data source to the data sink. Use of dedicated buffers 302 and dedicated buses 310 allows for concurrent data transfer from the data source to the second buffer while the data sink reads data from the first buffer thereby pipelining the data transfer from the data source to the data sink.

PBI control logic 306 (also referred to as "Buffer Manager" herein) is enabled to organize buffers 302 and buses 310 for assignment to data sources and data sinks. PBI control logic 306 assigns buffers 302 to data sources based on availability, size of buffer 302 requested or size of data transfer requested. PBI control logic 306 is enabled to be programmed via software, hardware and/or firmware and to organize buffers 302 in any form including but not limited to a First in First Out (FIFO) queue, sparse matrix or a linked-list. PBI control logic 306 is also enabled to control flow if a data source feeds to buffers 302 faster than a data sink consumes data from buffer 302. In an embodiment, PBI 300 maintains a queue of available buffers, buffers that have been written by a data source and buffers that are to be read by/have been read by a data sink. Maintaining a queue of buffers allows the PBI 300 to schedule flow of traffic between data sources and data sinks in the event a data source transfers data to a buffer faster than a data sink reads data from a buffer or if the data sink reads data from a buffer faster than a data source can write data to the buffer.

It is to be appreciated that dedicated PBI buses 310 are distinct from the system bus 200. Since data is transferred by a data source to the second buffer via a second bus while data is read by the data sink from the first buffer via a first bus, bus contention as described above with reference to FIG. 2 is avoided. Furthermore, since the data source writes to the second buffer and the data sink reads from the first buffer simultaneously, data transfer from the data source to the data sink is pipelined. Since processor 104 bandwidth is not involved in memory/buffer allocation or bus contention there are no memory or scheduling conflicts that utilize excessive processor 104 bandwidth. Thus use of pipelined buffer interconnect 300 significantly speeds up data transfer from a data source to a data sink.

Control registers in control and status registers 304 may also be used by a device driver of a data source and/or application 112 to initiate and/or manage a data transfer from a data source to a data sink. For example, a data transfer from a data source to a data sink may be initiated by writing to a control register in control and status registers 304. In yet another embodiment, a request for data transfer may be initiated via a control signal to control logic 306 from a device driver or application 112. Data transfer may also be initiated by a control signal from processor 104 or write to a control register 304 to indicate a request for a data transfer from a data source to a data sink. Control registers in control and status registers 304 may also be used to partition a memory into buffers 302 and set the size of buffers 302. Control registers in control and status registers 304 may also be used to organize buffers 302 into different configurations including but not limited to linked lists, First In First Out (FIFO) queues and sparse matrices. In an embodiment, at least one control and status register 304 is associated with each buffer 302. PBI 300 controls include but are not limited to starting a data transfer, stopping a data transfer, allocating and changing data buffer sizes, scheduling timeout periods, etc. Controls can be sent to PBI 300 via dedicated control pins in PBI 300, via control lines or via software programmable control registers in control and status registers 304. PBI 300 is enabled to interface with hardware such as processor 104 or core 102 via means including but not limited to control lines, interrupt lines and control registers for software programming and control.

The data source may be granted write only or both read and write access to the a buffer by setting a value in a status register in PBI control and status registers 304. Similarly, the data sink may be granted read only or both read and write access to a buffer by setting a value in a status register in control and status registers 304. Interrupt vector table 308 is used by PBI control logic 306 to signal interrupts to processor 104 indicating arbitrary states or conditions in PBI 300 including but not limited to error conditions, completion codes, start of data transfer from the data source to the data sink and end of data transfer from the data source to the data sink. Status may also be set via dedicated control pins in PBI 300, via control lines or via software programmable registers such as control and status registers 304.

In an embodiment, PBI control logic 306 is enabled to generate interrupts for control and status via interrupt lines or interrupt pins coupled to processor 104. Interrupt handling mechanisms are typically serviced by interrupt handler 114 running on processor 104. PBI 300 interrupts are software programmable via interrupt vector table 308.

Buffers 302 may be any form of storage including but not limited to dual-ported Random Access Memory (RAM), scratch pad RAM, disk drive 108, system memory 106, cache or any other form of memory. Buffers 302 may be locked while in use via a hardware lock, such as a control line allowing only an assigned data source to write or an assigned data sink to read from a particular buffer. Alternatively a software lock such as a test-and-set lock may also be used. After buffer 302 has been written to by a data source and read by a data sink, it is released and made available for other data transfer operations. In an embodiment, dual-ported memory may be used as buffers 302 thereby allowing buffers to be locked while in use and freed when finished. Buffers 302 may also be used by a remote processor or controller (not shown) via PBI control logic 306 or PBI control and status registers 304.

In an embodiment, PBI 300 may move data without using buffers 302 from a data source to a data sink, if the data source and/or data sink can map memory and busses 310 in a sharable, controlled manner to allow the data source and data sink to transfer data directly to each other. In this case, buffers 302 are not used and instead the data source and data sink directly move data between themselves using dedicated buses 310. In this case, PBI control logic 302 is built directly into data source and data sink. This allows PBI 300 to be built into a data source or a data sink as a standard component or a standard interface. PBI 300 may be interfaced to any peripheral PHY via control logic in addition to any other interfaces a peripheral PHY may already have. PBI 300 is enabled to co-exist with other interconnect mechanisms a peripheral PHY may be using.

In an embodiment, PBI 300 can be used as an external interface by a data source and/or data sink which does not internally implement PBI 300. Both internal and external implementations of PBI 300 may be used by a data source or a data sink. For example, cores 102 or physical (PHY) logic blocks may implement PBI 300. Disk drive controllers may also internally implement PBI 300. This would allow standard components to communicate over PBI 300 as a standard interface for peripheral data transfer.

In an embodiment PBI 300 is fully programmable and controllable as a stand-alone core allowing a data source to specify the data sink of a specific buffer 302. Software may control PBI 300 directly for transferring data at high speeds between endpoint cores 102.

Figure 4:
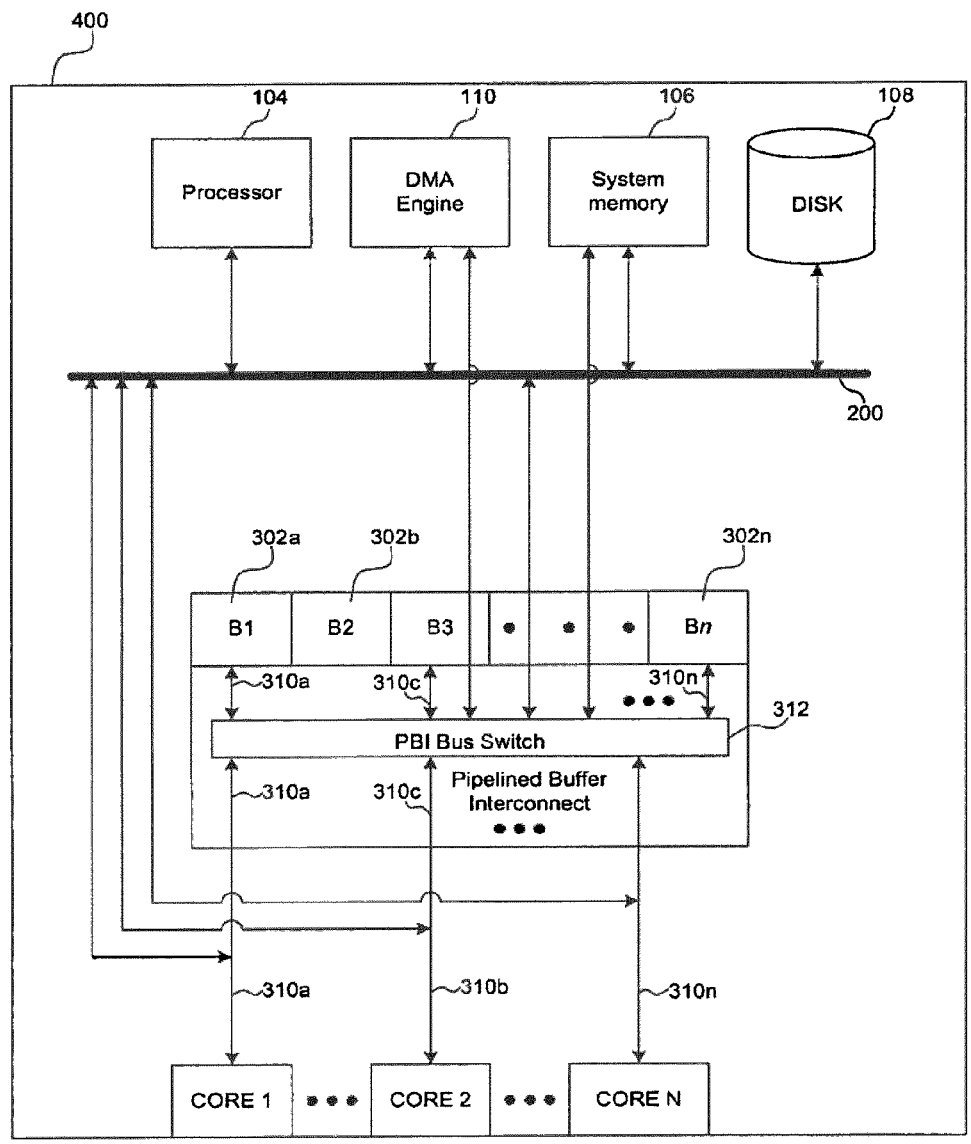
FIG. 4 illustrates an example of a pipelined buffer interconnect in a system according to an embodiment of the invention.

FIG. 4 illustrates an example of a pipelined buffer interconnect 300 in a system 400 according to an embodiment of the invention.

System 400 comprises processor 104, direct memory access engine 110, system memory 106, disk drive 108, pipelined buffer interconnect 300, N cores 102a-n and system bus 200. Processor 104, direct memory access engine 110, system memory 106, disk drive 108 are either coupled directly to PBI bus switching network 312 of buffer interconnect 300 or via system bus 200. Cores 102a-n, processor 104, direct memory access engine 110, system memory 106 and disk drive 108 may be selectively coupled to PBI bus switch 312. In the example shown in FIG. 4, cores 102a-n are coupled to PBI bus switch 312 and system bus 200. In another embodiment, only cores 102a-n or peripherals may be coupled only to PBI bus switch 312.

The advantage of PBI 300 illustrated in FIG. 4 is that data transfers between sources and sinks using PBI 300 occur over dedicated buses 310 controlled by switch 312 and independent of the system bus 200. This allows PBI 300 to transfer data with minimal impact on processor 104 activities such as the Operating System, applications 112 and system bus 200 or any other busses (not shown) used by processor 104, memory 106 or disk drive 108.

Figure 5:
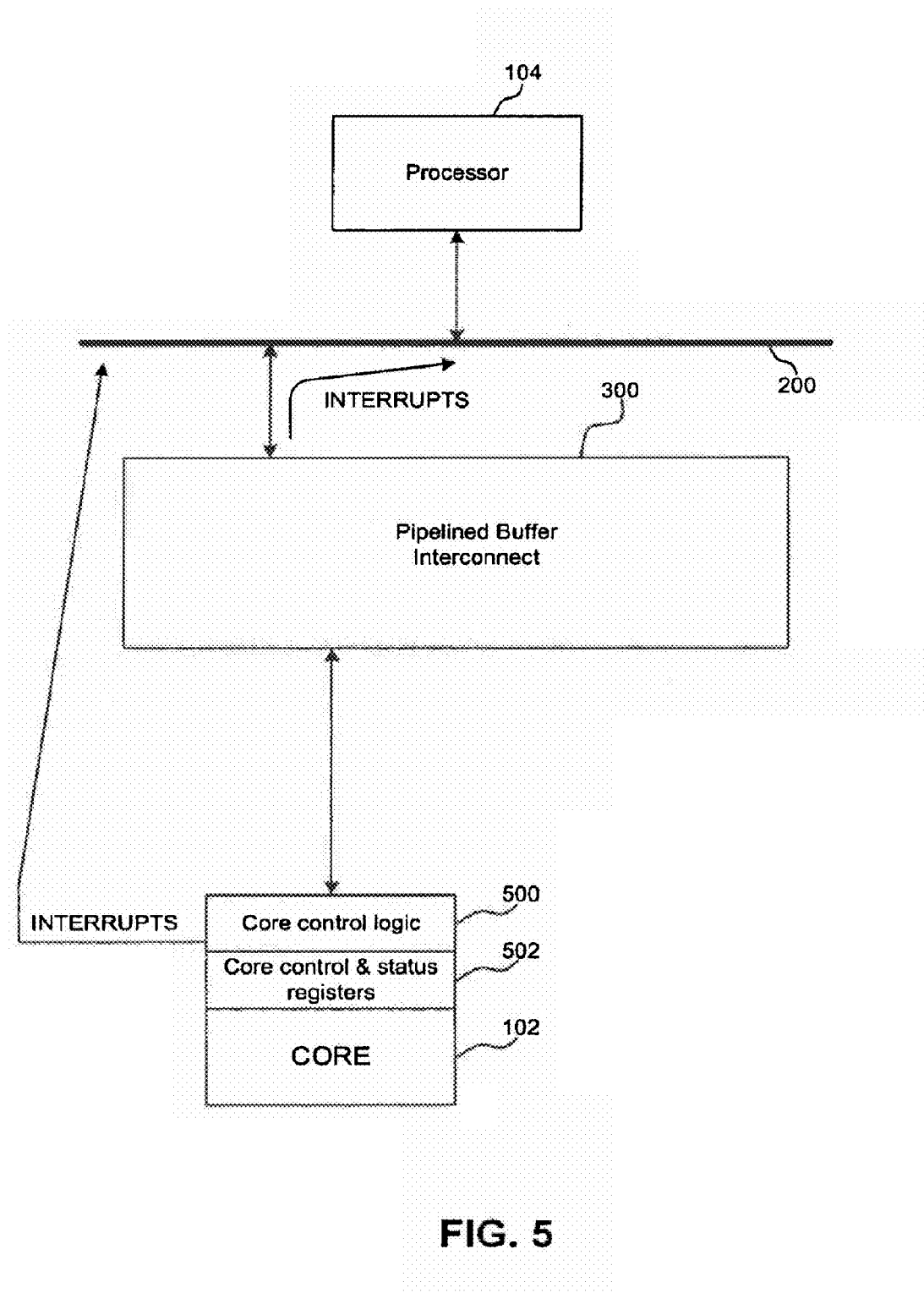
FIG. 5 illustrates examples of pipelined buffer interconnect glue logic added to a core to interface with a pipelined buffer interconnect.

FIG. 5 illustrates examples of pipelined buffer interconnect glue logic added to a core to interface with pipelined buffer interconnect 300.

Control logic 500 and control and status registers 502 are logic blocks added to standard cores 102 that are available from a third party intellectual property vendor or manufactured internally. Processor 104 is coupled to system bus 200 and pipelined buffer interconnect 300 is coupled to core 102 via control lines to core control logic 500. Core 102 is enabled to send interrupts to processor 104 using core control logic 500 and via system bus 200. In an embodiment, core 102 may be directly coupled to processor 104.

In an embodiment glue logic, comprising core control logic 500 and core control and status registers 502, may need to be added to core 102 to interface with PBI 300. The advantage of these logic blocks is that standard cores 102 do not need to be modified to be compatible with PBI 300. In an embodiment, pipelined buffer interconnect 300 communicates with core 102 via control status registers 502. In an embodiment, core 102 may instruct pipelined buffer interconnect 300 to conduct a data transfer via control signals generated by core control logic 500. In an alternate embodiment, core 102 may instruct pipelined buffer interconnect 300 to conduct a data transfer by writing to control registers in PBI control and status registers 304 via core control logic 500. In yet another embodiment, core 102 may set a bit in a register in core control and status register 502 indicating need for a data transfer request to PBI 300. Processor 104 may periodically poll the registers in core control and status registers 502 and determine a data transfer request from core 102 based on the bit set in core control and status registers 502. Core control logic 500 may also be enabled to write to a control register in PBI 300 indicating size of a buffer 302 required for data transfer by core 102. Core control logic 500 may also be enabled to write to a control register in PBI 300 indicating a destination data sink. In another embodiment core control logic 500 interrupts processor 104 via system bus 200 and requests processor 104 to initiate a data transfer using pipelined buffer interconnect 300. In another embodiment processor 104 interacts with pipeline buffer interconnect 300 by writing to a register in control and status registers 302 indicating a request for data transfer by core 102. In an embodiment, processor 104 may send control signals to core control logic 500 or write to core control and status registers 502 to pause or terminate data transfer to a data sink. Core control logic 500 may interface directly with PBI control logic 306 or PBI control and status registers 304. Control logic 500 may be used to indicate arbitrary states or conditions in PBI 300 including but not limited to error conditions, completion codes, start of data transfer from the data source to the data sink via buffers 302 and end of data transfer from the data source to the data sink. Processor 104 may periodically poll registers in core control and status registers 502. A register in core control and status registers may be written in by application 112 or a device driver to indicate that an error has occurred in data transfer.

Figure 6:
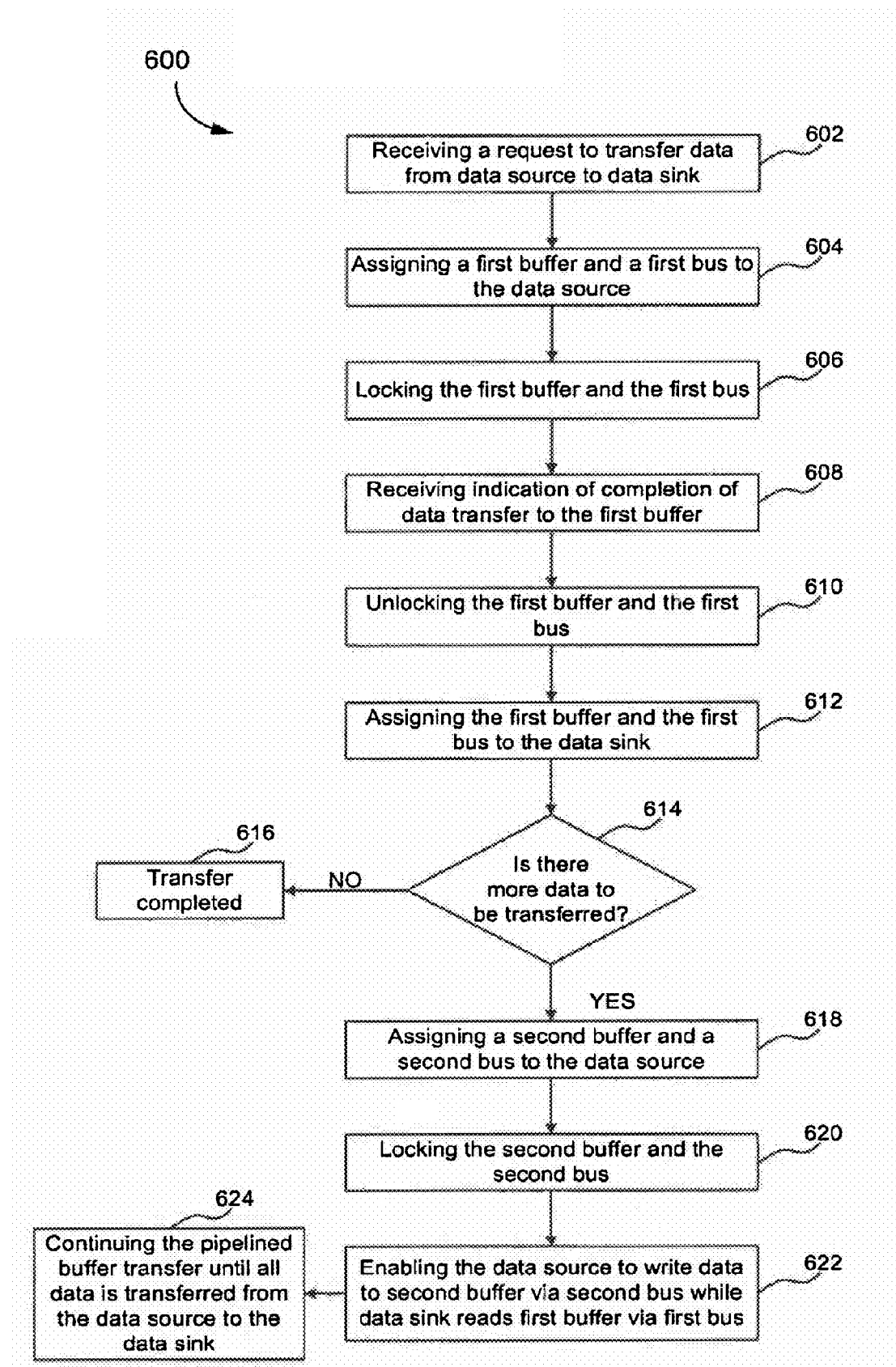
FIG. 6 illustrates a flowchart showing steps performed by the pipelined buffer interconnect according to an embodiment of the invention.

FIG. 6 illustrates a flowchart 600 showing steps performed by the pipelined buffer interconnect according to an embodiment of the invention.

In step 602, a request is received to transfer data from a data source to a data sink. In an embodiment, pipelined buffer interconnect 300 receives a request to transfer data from a data source, for example core 102a, to a data sink, for example core 102c.

In step 604, a first buffer and a first bus is assigned to the data source. For example, pipelined buffer interconnect 300 assigns a first buffer, e.g. buffer 302a, and first bus, e.g. bus 310a, to core 102a.

In step 606, the first buffer and the first bus are locked thereby allowing only the data source to access the first buffer and the first bus. For example, pipelined buffer interconnect 300 locks buffer 302a and bus 310a so that only buffer 302a and bus 310a can access them.

In step 608, indication of completion of data transfer to the first buffer is received. For example, core 102a may indicate completion of data transfer to buffer 302a. Core 102a may indicate completion of data transfer by writing to a control register in PBI control and status registers 304 of pipelined buffer interconnect 300 or via an interrupt to processor 104 or via a control signal to pipelined buffer interconnect 300. In an embodiment, core 102a may write to a register in core control and status register 300 to indicate completion of data transfer to buffer 302a. The register in core control and status register 300 may be polled by processor 104.

In step 610, the first buffer and first bus are unlocked. For example, pipelined buffer interconnect 300 unlocks buffer 302a and bus 310a.

In step 612, the data sink is assigned the first buffer and the first bus. In an embodiment, the first buffer and first bus may also be locked so as to allow only one or more assigned data sink(s) to access the first buffer via the first bus. The data sink then reads data from the first buffer via the first bus. In an embodiment read only access is granted to the data sink to prevent corruption of data. In an alternate embodiment, read and write access may be granted to the data sink. For example core 102c is assigned buffer 302a and bus 310a, buffer 302a and bus 310a are locked and core 102c reads data from buffer 302a via bus 310a.

In step 614, it is determined whether there is more data to be transferred than was transferred to the first buffer. The data source may have more data to transfer than the first buffer can accommodate. For example, it is determined whether core 102a has more data to transfer. If it is determined that more data is to be transferred then control passes to step 618. If it is determined that there is no more data to be transferred then control proceeds to step 616. In an embodiment, core 102a indicates whether it has more data to transfer to pipelined buffer interconnect 300.

In step 616, the data transfer from data source to data sink is complete since all data has been transferred from the data source to the data sink. In an embodiment, pipelined buffer interconnect 300 may be powered down after completing a data transfer from data source core 102a to data sink core 102c to conserve power.

In step 618, a second buffer and a second bus are assigned to the data source. For example, a second buffer 302d and dedicated bus 310d are assigned to core 102a by pipelined buffer interconnect 300. In an alternate embodiment second buffer 302d and second bus 310d may be requested by the core 102a.

In step 620, the second buffer and the second bus are locked thereby allowing only the data source to access the first buffer and the first bus. For example, pipelined buffer interconnect 300 may lock buffer 302d and bus 310d so as to only allow core 102a to access buffer 302d and bus 310d.

In step 622, the data source is enabled to write to the second buffer while the data sink simultaneously reads data from the first buffer. For example, pipelined buffer interconnect 300 enables data source core 102a to write the second buffer 302d via bus 310d, while data sink core 102c reads data from first buffer 302a via bus 310a. In this example, the second buffer 302d is being written by core 102a using bus 310d and the first buffer 302a is simultaneously being read by core 102c via bus 310a instead of conventional data transfer via system bus 200. This pipelines the data transfer from data source core 102a to data sync 102c.

In step 624, pipelined data transfer between data source and data sink is continued using buffers and dedicated buses until the required amount of data is transferred from the data source to the data sink. For example buffers 302 and busses 310 are used until the required amount of data has been transferred from data source 102a to data sink 102c.

3.b Adapters, Memory Interfaces and Connectors

Figure 7:
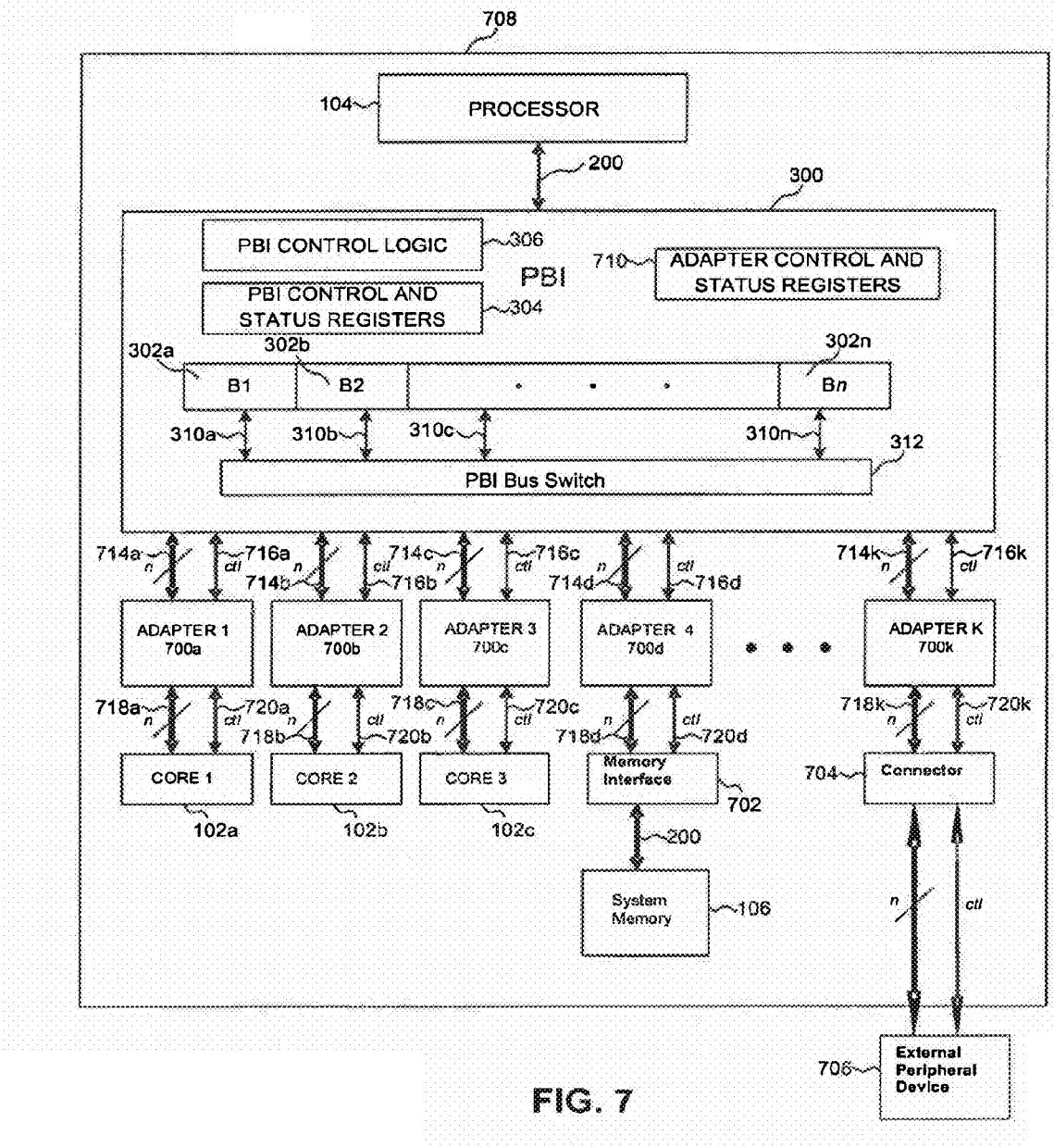
FIG. 7 illustrates adapters, a memory interface and a connector according to an embodiment of the invention.

FIG. 7 illustrates adapters, a memory interface and a connector according to an embodiment of the invention.

System 708 comprises processor 104, pipelined buffer interconnect 300, PBI control logic 306, PBI control and status registers 304, adapter control and status register 710, PBI bus switch 312, buffers 302a-n, adapters 700a-k, cores 102a-c, memory interface 702, system memory 106 and connector 704. External device 706 is coupled to system 708.

Processor 104 is coupled to pipelined buffer interconnect 300, adapters 700a-k are coupled to pipelined buffer interconnect 300 via K data buses 714a-k and control buses 716a-k. Cores 102a-c are coupled to adapters 700a-c by data buses 718a-c and control buses 720a-c. Memory interface 702 is coupled to adapter 700d by data bus 718d and control bus 720d. External peripheral device 706 is coupled to adapter 700k via connector 704. Connector 704 is coupled to adapter 700k via data bus 718k and control bus 720k. System memory is coupled to memory interface 702 via system bus 200. In an embodiment, adapters 700 are part of pipelined buffer interconnect 300 along with adapter control and status registers 710. In another embodiment, adapters 700 and adapter control and status registers 710 are external to pipelined buffer interconnect 300.

Each adapter 700 is coupled to PBI bus switch 312 via a n-bit wide data bus 714 and to PBI control logic via control bus 716. Each adapter 700 is also coupled to a device, such as a core 102, via an n-bit wide data bus 718 and a control bus 720. Adapters 700 are addressable and have an identification number (ID) associated with them. Adapters 700 may be associated or coupled with either a data source or a data sink. An adapter 700 associated with a data source is enabled to be associated with multiple adapters 700 that are associated with data sinks.

In the present embodiment, adapters 700 enable any peripheral device, PHY or core 102 to use PBI 300 as a standardized common interconnect on a system 708 (e.g. a System on Chip or Printed Circuit Board, (PCB)). Adapters 700 also enable an external device 706 to use PBI 300 via connector 704. Adapters 700 also provide an interface with system memory 106 via memory interface 702.

In an embodiment, PBI control logic 306 is enabled to interface with an arbitrary number of adapters 700. Adapter control and status registers 710 provide a register interface for each adapter 700. PBI control and status registers 304 and adapter control and status registers 710 may be polled by a controller or processor 104. Adapter 700 is also enabled to generate an interrupt for a controller or processor 104. Adapters 700 are coupled to PBI bus switch 312. Adapters 700 are enabled to read and write data to buffers 302 via dedicated buses 310 assigned via PBI bus switch 312. Adapters 700 are coupled to PBI bus switch 312 via K dedicated data buses 714a-k. Adapters 700 may also be coupled to one or more of PBI control logic 306, PBI control and status registers 304 and adapter control and status registers 710, directly or indirectly, via dedicated control buses 716a-k. Devices such as cores 102, memory interface 702 and connector 704 may be coupled to adapters 700 via dedicated data buses 718a-k and dedicated control buses 720a-k.

Upon receiving a request for a data transfer from a data source (e.g. core 102a) to a data sink (e.g. core 102c), adapter 700a is enabled to request PBI control logic 306 to assign a buffer (e.g. buffer 302b) and a bus (e.g. bus 310b) to core 102a for writing data via adapter 700a. Adapter 700a is enabled to request PBI control logic 306 to release buffer 302b and bus 310b upon indication from core 102a of completion of data transfer to buffer 302b. Adapter 700a is also enabled to request PBI control logic 312 to assign the buffer 302b and bus 310b to a second adapter (e.g. adapter 700c) coupled to data sink (e.g. core 102c). In an alternate embodiment, adapter 700a indicates the adapter 700c as a sink adapter to PBI control logic 312 which automatically assigns buffer 302b and bus 310b to adapter 700c upon determining that core 102a has completed writing to buffer 302b. Adapter 700a is also enabled to request PBI control logic 306 to assign a second buffer (e.g. buffer 302a) along with a second bus (e.g. bus 310a) to core 102a for writing data while core 102c simultaneously reads data from buffer 302b via adapter 700c, thereby pipelining the data transfer from core 102a to core 102c. Adapters 700 can read from or write to buffers 302 via buses 310 simultaneously and in parallel.

Memory interface 702 is coupled to adapter 700d via data bus 718c and control bus 720d. Memory interface 702 performs bus arbitration on system bus 200 if system memory 106 is a data source or a data sink. Connector 704 allows PBI 300 to be exposed to devices 706 external to system 708 by providing a generic interface to adapter 700k.

Figure 8:
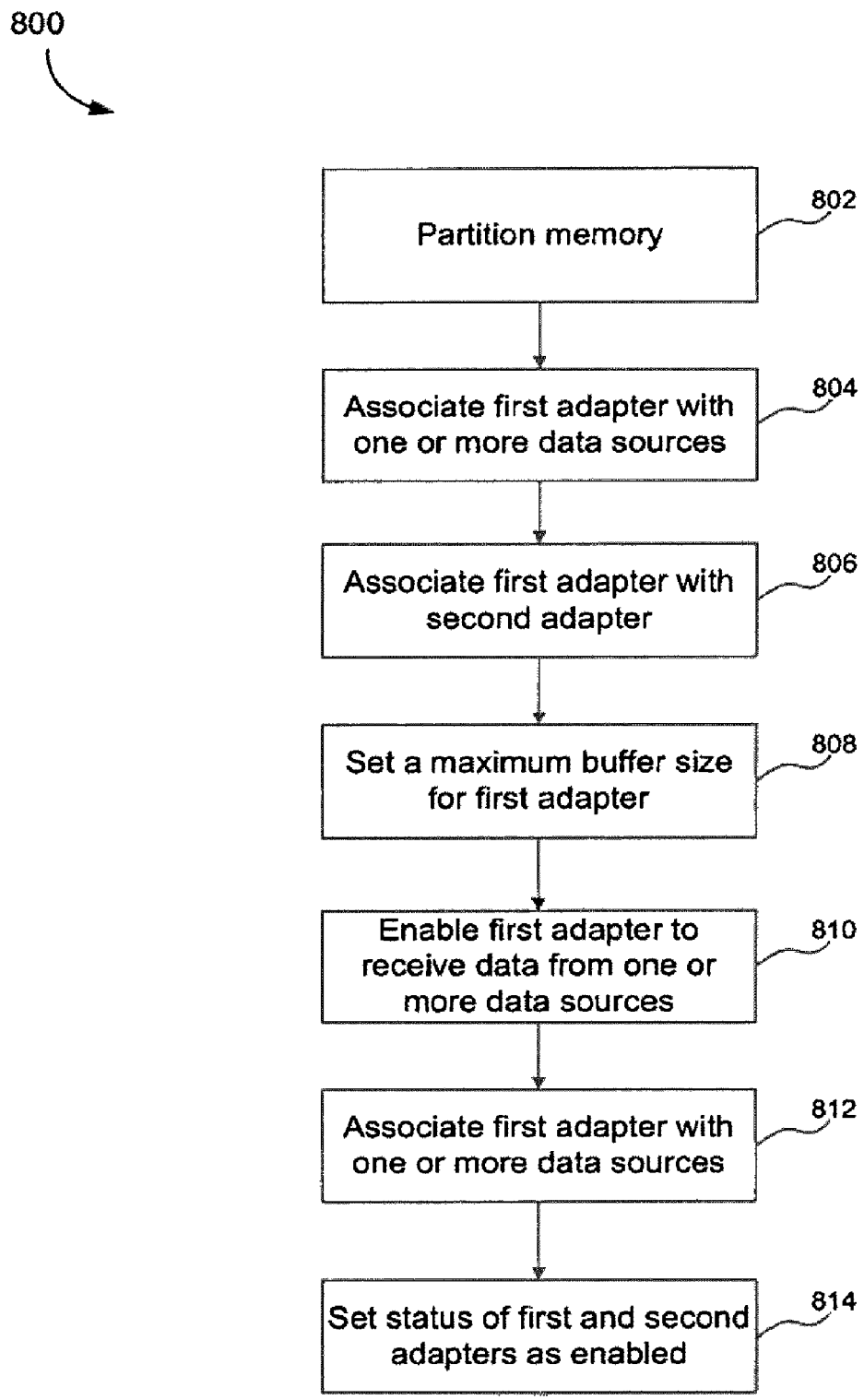
FIG. 8 illustrates a flowchart showing steps to program an adapter to facilitate transfer between a data source and a data sink.

FIG. 8 illustrates a flowchart 800 showing steps to program an adapter to facilitate transfer between a data source and a data sink.

In step 802, memory is partitioned. For example, memory is partitioned into buffers 302 by programming PBI control and status registers 304. As described above, the size and configuration of buffers 302 is arbitrary and may be set via PBI control and status registers 304 or PBI control logic 306. In an embodiment, an adapter 700 programs PBI to partition memory into buffers 302.

In step 804, a first adapter is associated with one or more data sources. For example, adapter 702a may be associated with a data source (e.g. core 102a).

In step 806, the first adapter is associated with a second adapter. For example, adapter 700a is associated with adapter 700c.

In step 808, a maximum buffer size is set for the first adapter. For example, first adapter 700a is programmed to use a buffer size of 32 kB. In an embodiment, first adapter 700a requests pipelined buffer interconnect 300 to use a buffer size of 32 kB by writing to PBI control and status registers 304 or via PBI control logic 306.

In step 810, the first adapter is enabled to receive data from a data source. For example, adapter 700a is enabled to receive data from core 102a.

In step 812, second adapter is associated with one or more data sinks. For example, adapter 700c is associated with a data sink (e.g. core 102c).

In step 814, the first and second adapters are enabled. For example, adapter 700a and adapter 700c are enabled by writing to their respective control registers in adapter control and status registers 710.

Figure 9:
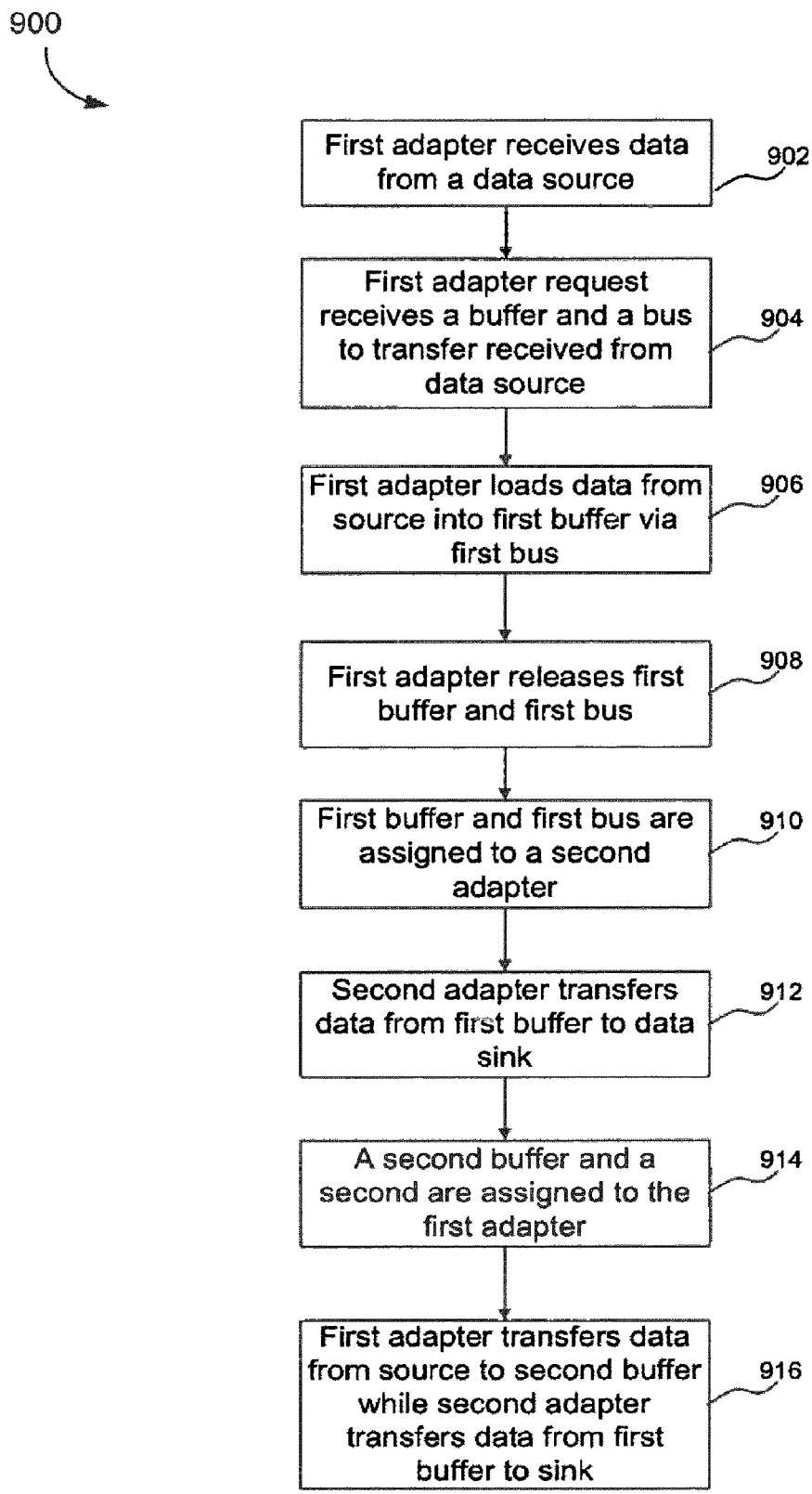
FIG. 9 illustrates a flowchart showing steps performed by adapters to transfer data between a data source and a data sink according to an embodiment of the invention.

FIG. 9 illustrates a flowchart showing steps performed by adapters to transfer data between a data source and a data sink according to an embodiment of the invention.

In step 902, a first adapter receives data from a data source. For example, adapter 700a receives data from a data source (e.g. core 102a).

In step 904, the first adapter requests a first buffer and a first bus to transfer data received from data source. For example, adapter 700a requests pipelined buffer interconnect 300 for a buffer and a bus. Pipelined buffer interconnect 300 assigns, for example, bus 310b and buffer 302b to adapter 700a.

In step 906 the first adapter loads data from the data source into the first buffer via the first bus. For example, adapter 700a loads data from core 102a into buffer 302b via bus 310b.

In step 908, the first adapter releases the first buffer and the first bus after completing transfer of data to the first buffer. For example, adapter 700a releases bus 310b and buffer 302b to pipeline buffer interconnect 300.

In step 910, the first buffer and the first bus are assigned to a second adapter which is associated with one or more data sinks. For example, pipelined buffer interconnect 300 assigns first bus 310b and first buffer 302b to adapter 700c which is associated with a data sink (e.g. core 102c).

In step 912, second adapter transfers data from the first buffer to one or more data sinks. For example, adapter 700c reads data from buffer 302b via bus 310b and transfers it to core 102c via bus 718c.

In step 914, a second buffer and a second bus are assigned to the first adapter. For example, buffer 302c and bus 310c are assigned by pipelined buffer interconnect 300 to adapter 700a.

In step 916, the first adapter transfers data from the data source to the second buffer while the second adapter transfers data from the first buffer to the data sink thereby pipelining transfer of data from the data source to the data sink. For example, adapter 700a transfers data from core 102a to buffer 302c via bus 310c while adapter 700c reads data from buffer 302b via bus 310b and transfers the read data to core 102C via bus 718c thereby pipelining transfer of data from the data source core 102a to the data sink core 102c.

4a. Example Device Driver Operational Environment

Figure 10:
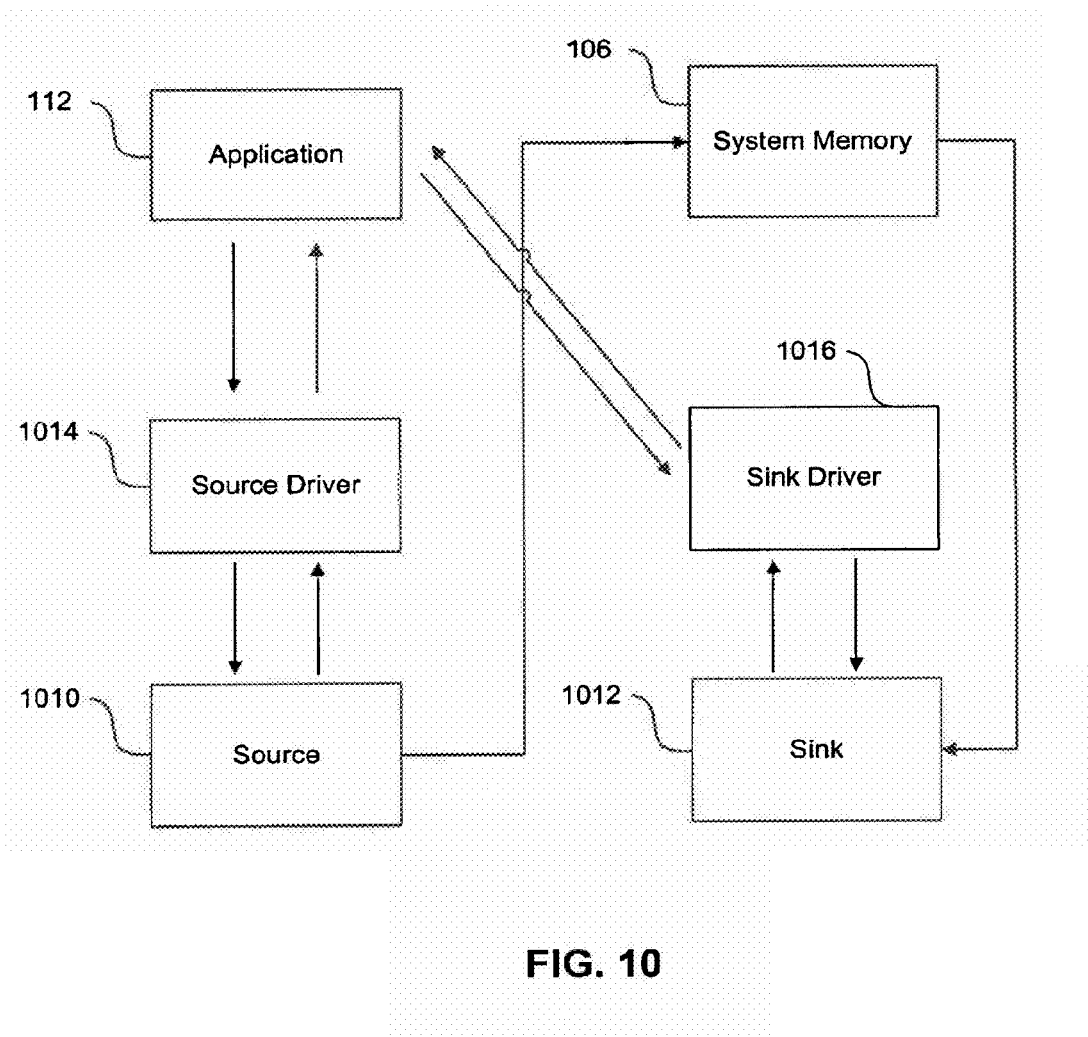
FIG. 10 illustrates conventional software negotiation to transfer data between devices.

FIG. 10 illustrates conventional software negotiation to transfer data between devices.

Application 112 is enabled to communicate with source 1010 via source driver 1014. Application 112 is enabled to communicate with sink 1012 via sink driver 1016. System memory is coupled to source 1010 and sink 1012. As described above, source 1010 and sink 1012 include but are not limited to cores 102, transport mechanism (e.g. Universal Serial Bus (USB)), a communications mechanism (e.g. token ring network), interface mechanism (e.g. IDE/ATE disk interface), adapter mechanism (e.g. RS232 connector), interconnect mechanism (e.g. interconnect bus), bus mechanism (e.g. system or memory bus) or a memory device including but not limited to a disk drive 108, system memory 106, Random Access Memory (RAM), Read Only Memory, Compact Disk Drive, Digital Video Disk Drive, Blue Ray Disk drive, Wireless Fidelity (WiFi), Bluetooth, Transport Control Protocol/Internet Protocol and Infrared Data Association (IrDA) port.

Source driver 1014 when transferring data from source 1010 typically utilizes memory such as system memory 106 and other intermediate buffers (not shown) to temporarily buffer data before transferring it to sink 1012. The amount of data buffered in system memory 106 can be as small as a single transfer unit (e.g. a byte). In this typical mode performance suffers because data is copied in small transfer units between several buffers by source driver 1014 and/or sink driver 1016 to complete the transfer of data from source 1010 to sink 1012. For example, to send data from source 1010 to sink 1012, source driver 1010 requests application 112 to transfer data to sink 1012. Application 112 requests an Operating System's file system (not shown) to read a data block from the source 1010. The file system calls a sink driver 1016 to read data into a temporary buffer or register API. Sink driver 1016 copies data into sink 1012. Application 112 receives a block of data and stores it into a buffer in memory 106. Application 112 requests source driver 104 to send a next block of data and the cycle continues till all data from source 1010 to sink 1012 is transferred.

To overcome the performance problems caused by the layers of function calls and data buffer copies, a streamlined device driver architecture which allows device drivers to communicate directly with each other and share buffers is described below.

4.b Software Interconnect Drivers

Figure 11:
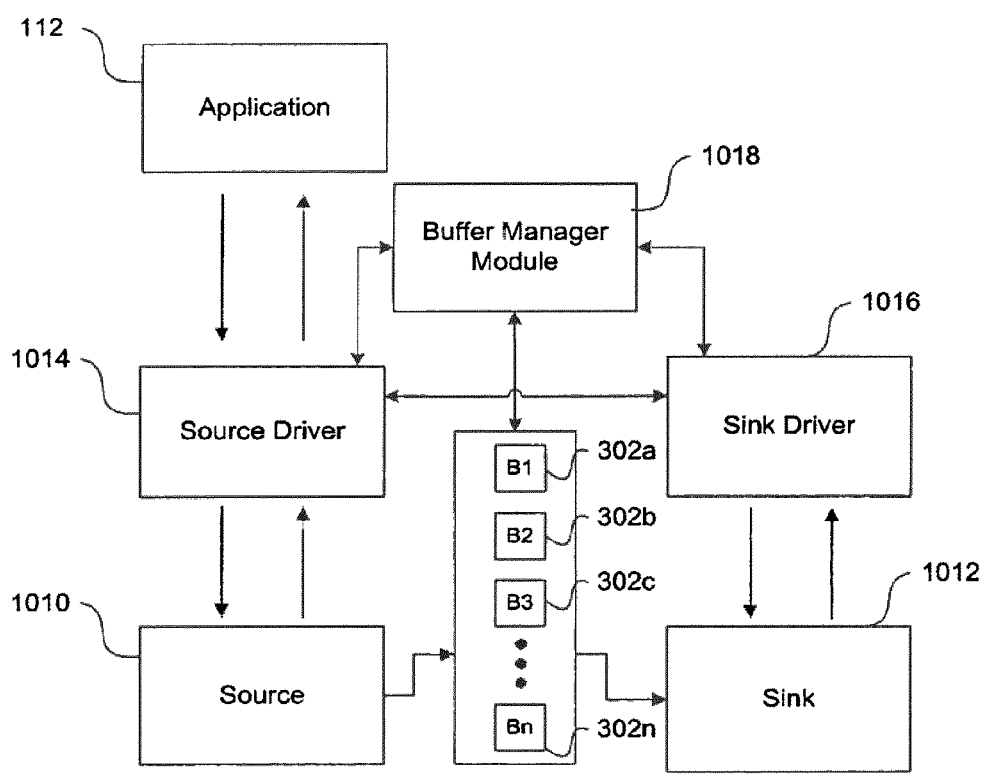
FIG. 11 illustrates an example of data transfer between a data source and a data sink using device drivers according to an embodiment of the invention.

FIG. 11 illustrates an example of data transfer between a data source and a data sink using device drivers according to an embodiment of the invention.

FIG. 11 illustrates source 1010, sink 1012, source driver 1014, sink driver 1016, application 112, buffer manager module 1018, and buffers 302. Source 1010 is enabled to communicate with source driver 1014. Sink 1012 is enabled to communicate with sink driver 1016. Both source driver 1014 and sink driver 1016 are enabled to communicate with application 112 and buffer manager module 1018. Source driver 1014, application 112, buffer manager module 1018, and sink driver 1016 are software modules which run on a processor 104 (not shown). In this example buffers 302 are not part of PBI 300.

The embodiments described herein define a framework for device drivers to share a common buffer management scheme for sharing data buffers 302 between source and sink drivers and to allow rapid transfer of data between source and sink which will minimize buffer copies and use fast memory in kernel space where possible. Shared buffer pool 302 allows buffers 302 to be sized and re-used to pass data between source 1010 and sink 1012 using source driver 1014 and sink driver 1016. Buffer pool manager 302 allows source driver 1014 to lock a buffer 302, set the buffer size, read or write data into the buffer from source 1010, identify the intended recipient (i.e. sink 1012) for the buffer 302, identify the period of time data is valid for, assign a buffer 302 to the source driver 1014, release the buffer 302 to the sink driver 1016 or release the buffer 302 to a buffer pool for use by a next source and sink.

Besides minimizing multiple buffer copies, an advantage of the embodiment presented herein is that source 1012 and sink driver 1014 may communicate directly between themselves without intervention by application 112. Application 112 only sets up the endpoints of the data transfer i.e. source driver 1014 and sink driver 1016. This essentially reduces the call function chain to a single application 112 setup transfer function call. For example, source 1010 may be required to transfer data to sink 1012. Source 1010 is enabled to request source driver 1014 to initiate the data transfer to sink 1012. Source driver 1014 communicates this request to application 112 and to sink driver 1016. If application 112 approves the request then it also sets up source driver 1014 and sink driver 1016 as endpoints of the data transfer. Source driver 1014 requests buffer manager module 1018 to assign a buffer to source 1010. Buffer manager module 1018 assigns, for example, buffer 302b to source 1010. Source 1010 transfers data to buffer 302b. Buffer manager module 1018 locks buffer 302b such that only source 1010 can access buffer 302b and write data into buffer 302b. Upon completion of data transfer by source 1010 to buffer 302b, source driver indicates to buffer manager module 1018 to unlock buffer 302b. Source driver 1014 indicates presence of data in buffer 302b to sink driver 1016. Sink driver receives ownership of buffer 302b from buffer manager module 1018. Buffer manager module 1018 locks buffer 302b such that only sink 1012 can read data from buffer 302b. While sink 1012 reads data from buffer 302b, source driver 1014 requests a second buffer from buffer manager module 1018. Buffer manager module 1018 assigns, for example, buffer 302d to source 1010. While source 1010 transfers data to buffer 302d, sink 1012 reads data from buffer 302b thereby pipelining the transfer of data from source 1010 to sink 1012 without incurring the penalty of bus contention on system bus 200 or taking up processor 104 bandwidth.

Buffers 302 are managed by buffer manager module 1018. Buffer manager module 1018 allow device drivers to lock, write and read buffers 302 and share buffers 302 with other drivers. Use of buffer manager 1018 and dedicated buffers 302 avoids conventional multiple buffer copies as described above in FIG. 10. Buffers 302 may be passed from a source driver 1018 to a sink driver using buffer identification (ID) numbers or other identification methods. In an embodiment buffers 302 may be passed between drivers as pointers. Source driver 1014 and sink driver 1016 may maintain respective source 1010 and sink 1012 buffer queues. Alternatively, buffer manager module 1018 may maintain respective buffer queues for a source 1010 and a sink 1012. In an embodiment, buffer manager 1018 uses the fastest memory available to form buffers 302. This memory is preferably not on the system bus 200 so as to avoid bus contention. If there is memory available which is faster than system memory 106, then that memory may be used to form buffers 302. In an embodiment system memory 106 may also be used to form buffers 302.

Buffer manager module 1018 is enabled to partition memory into buffers 302 of variable size and configure them in variable format including but not limited to a First in First Out (FIFO) queue, a sparse matrix and a linked list. Source 1010 and sink 1012 are coupled to buffers 302 via any available bus. Preferably the bus coupling source 1010 and sink 1012 to buffers 302 is a dedicated bus for use by source 1010 and sink 1012 and does not require bus arbitration. Alternatively, if such as bus is not available, system bus 200 may be used. In an embodiment, buffer manager module 1018 is equivalent to PBI control logic 306 and PBI control and status registers 304 in functionality. Buffer manager module 1018 allocates a buffer 302 to source 1010 or sink 1014, assigns and locks a buffer 302 for dedicated use for a specific driver and releases and unlocks the buffer 302 and returns it to a common buffer pool for re-use by other drivers. Source driver 1014 and sink driver 1016 are enabled to communicate with buffer manager module 1018 to acquire and release buffers as needed.

In an embodiment, buffer manager module 1018 maintains a queue of buffers which are written to by source 1010 and are to be read by sink 1012. Maintaining a queue of buffers allows buffer manager module 1018 to manage buffers 302 in the event that source 1010 transfers data faster than source 1010 can read. Since buffer manager module maintains a queue, sink 1012 can read buffers 302 written by source 1010 at its own pace. In an alternate embodiment, sink driver 1016 may indicate to buffer manager module 1018 that sink 1012 has no more capacity to accept data. Buffer manager module instructs source driver 1014 stops transfer of data from source 1010 to buffers 302. To another embodiment, sink driver 1016 may directly indicate to source driver 1014 that sink 1012 is unable to accept any more data from source 1010. In this case, source driver 1014 instructs source 1010 to stop transfer of data to buffers 302.

In an embodiment, buffer manager module 1018 includes a software control and status interface/module (not shown) to create and manage arbitrary sized buffers organized in any format including but not limited to a FIFO, linked list, sparse matrix, or regular array of buffers to be used as data sources and data sinks. Buffer manager module 1018 also includes an interface to enable device drivers (e.g. driver 1014 and 1016) of low-level device control software logic to register as device-driver endpoints with buffer manager module 1018 as a data source or a data sink. Buffer manager module 1018 includes an interface for device-driver endpoints to request locked memory buffers to use as data sources and data sinks. Buffer manager module 1018 includes an interface for device driver endpoints to re-assign locked buffers to another device driver endpoint as a data source or a data sink. Buffer manager module 1018 includes a common interface for all device-driver endpoints to enable communications directly between device-driver endpoints using standard interfaces containing control, status, and data information to optimize data transfer between device-driver endpoints. Buffer manager module 1018 further includes a common interface for all device-driver endpoints to provide or receive control and status notifications to upper layers of software including but not limited to specific software logic running in various tasks, processes, application programs, interrupt handlers or other arbitrary operating system API's.

In an alternate embodiment, if PBI 300 is available as a resource, source driver 1014 may program PBI 300 control logic 304 and/or control and status registers 304 to transfer data from source 1010 to sink 1012 as described above with reference to FIGS. 3-6. In an embodiment, where data is simply being transferred between source driver 1014 and sink driver 1016, PBI 300 is used transparently by application 112 so that buffer copying and function call chains are drastically reduced.

In an embodiment, direct call API is available for driver-to-driver communications for notifying drivers when buffers intended for them are available. In an embodiment, a common driver base is used to create source driver 1014 and sink driver 1016. These drivers could be implemented as a C++ base class or else as a common set of functions enabling any device driver to interface with buffer manager module 1018. Each common driver would communicate to other common drivers via a common API. The device specific portion of each driver communicates directly with device control and status registers to initiate or terminate data transfers.

Figure 12:
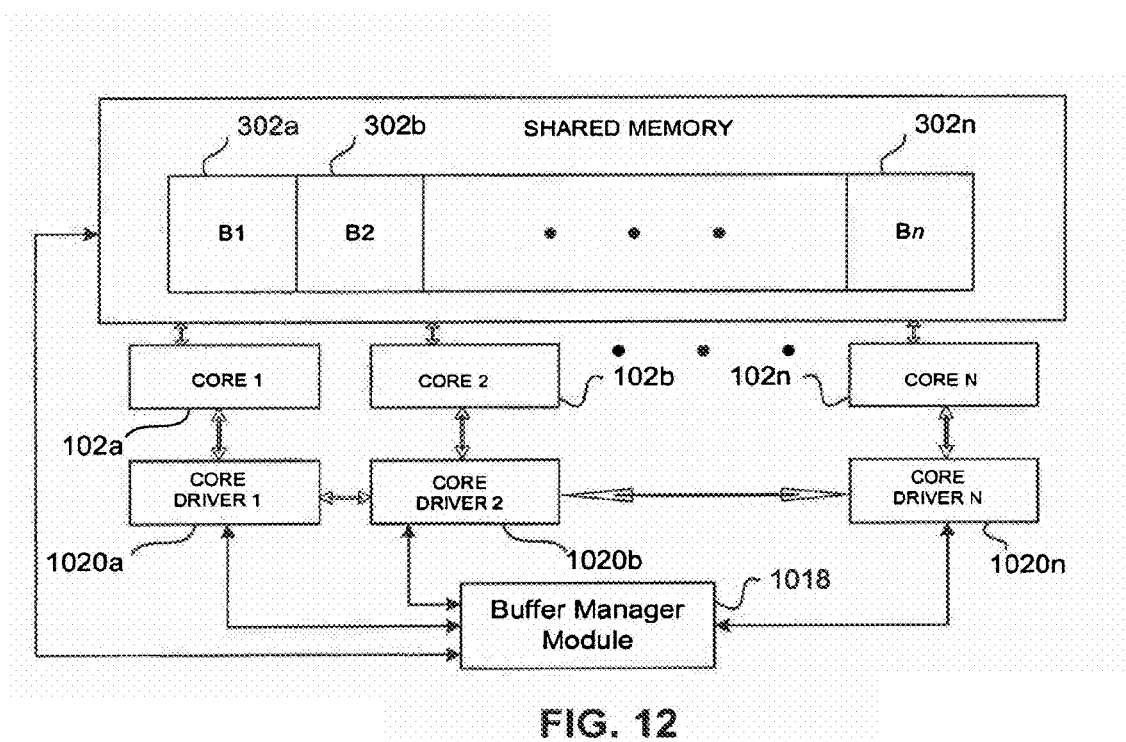
FIG. 12 illustrates data transfers between multiple data sources and data sinks using device drivers according to an embodiment of the invention.

FIG. 12 illustrates data transfer between multiple data sources and data sinks using device drivers according to an embodiment of the invention.

FIG. 12 illustrates cores 102 *a-n*, drivers 1020*a-n*, buffer manager module 1018 and buffers 302. Cores 102*a-n* are coupled to buffers 302 and drivers 1020 are enabled to communicate with their corresponding cores 102*a-n* and to buffer manager module 1018. Buffer manager module manages buffers 302. In an embodiment, drivers 1020 may also be enabled to communicate with buffers 302. Drivers 1020 are enabled to communicate with each other as well as buffer manager module 1018. A core 102 may be a data source or a data sink. A source (e.g. core 102*a*) requests its corresponding source driver (driver 1020*a*) to initiate a data transfer to a sink (e.g. core 102*c*). Driver 1020*a* requests buffer manager module 1018 to assign a buffer 302 to transfer data from source core 102*a*. Buffer manager module assigns a buffer (e.g. buffer 302*b*) to core 102*a* and locks buffer 302*b* so as to enable only core 102*a* to access buffer 302*b*. When core 102*a* has finished writing to buffer 302*b*, driver 1020*a* indicates to buffer manager module 1018 to unlock buffer 302*b* and assign buffer 302*b* to sink core 102*c*. Buffer manager module assigns and locks a second buffer (e.g. buffer 302*a*) to core 102*a* while data from buffer 302*b* is read by sink core 102*c* thereby pipelining transfer of data from source core 102*a* to sink core 102*c*.

5. Trigger Core

Figure 13:
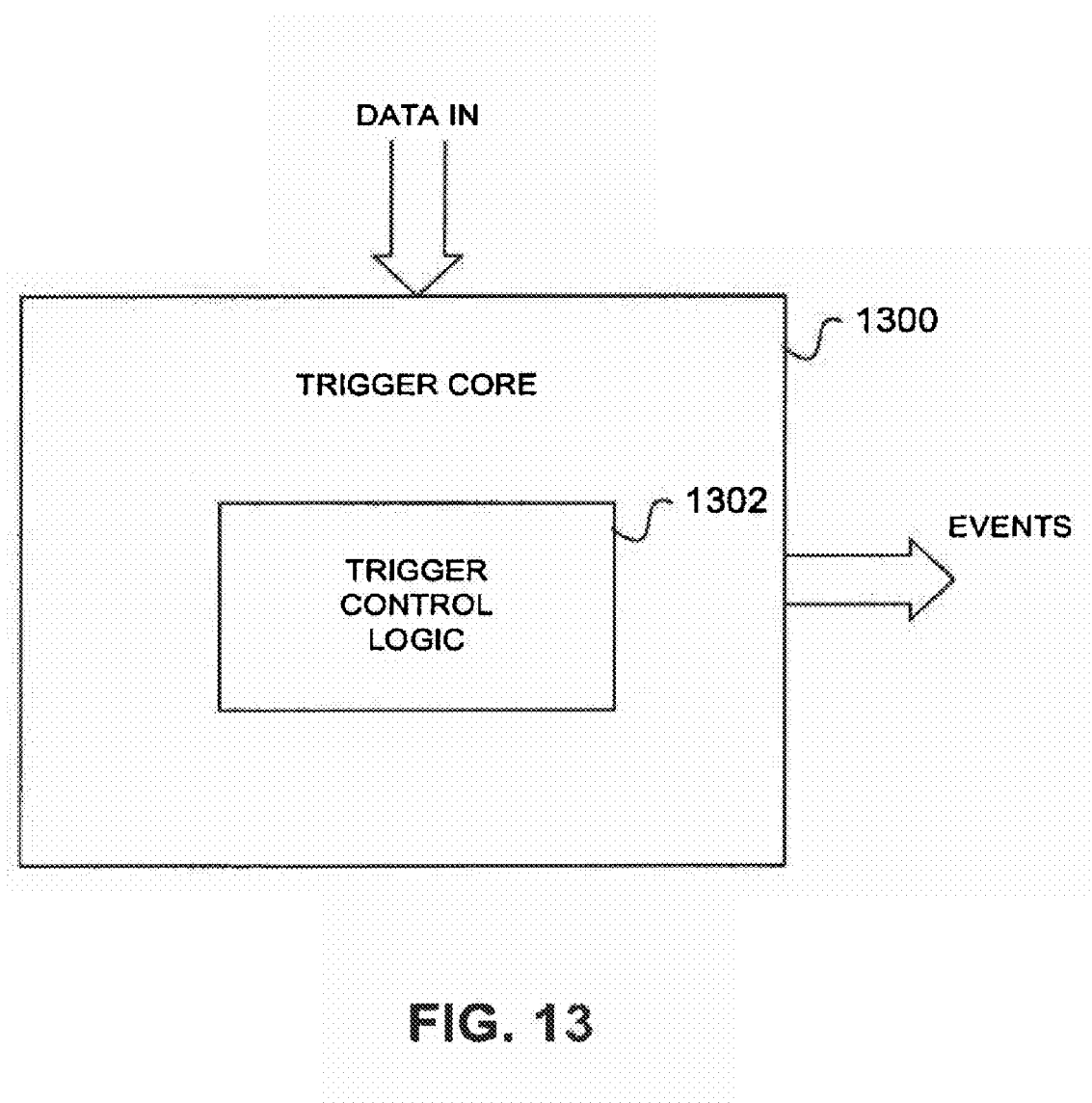
FIG. 13 illustrates a first example of a trigger core according to an embodiment of the invention.

FIG. 13 illustrates a first example of a trigger core 1300 according to an embodiment of the invention.

Trigger core 1300 comprises trigger control logic 1302 which performs all logical operations of trigger core 1300. In an embodiment control and status registers may also be present in core 1300 as is described below. Control logic 1302 in trigger core 1300 is enabled to monitor endpoint data stream and control signal traffic between data sources and data sinks for one or more data patterns which may be separated in time. A pattern may be used to represent one or more of a state, condition, error condition, protocol control event, protocol status event or event based on data in the data stream and control bits in control line(s) between the data source and the data sink. A protocol control event includes but is not limited to expected bit rate, expected packet size, expected number of data units and timeout periods. A protocol status event includes but is not limited to flow control status, notification of number of packets sent or received, time stamp information, session keys and communication endpoint identification. Patterns, time intervals and trigger conditions may be programmed in trigger core 1300 as will be described below. If a pattern is detected, trigger core 1300 is enabled to, for example, provide an indication or "trigger an event" which includes but is not limited to sending interrupts to processor 104 for processing by software. In an embodiment, an indication if provided by trigger core 1300 even if there is no pattern match. Trigger core 1300 may be coupled to one or more of data sources, data sinks, processor 104 and pipelined buffer control 300 via control lines and/or interrupt lines to allow for software programming and control.

Trigger core 1300 controls include but are not limited to start, stop, set data buffer sizes, change data buffer sizes, timeout periods and trigger conditions. Controls can be sent by programming control logic 1302 via dedicated hardware lines (not shown), pins (not shown) and/or software programmable registers (not shown). Trigger core 1300 status includes but is not limited to completion codes, events and/or error conditions. Status information may also be sent to data sources and data sinks or received from data sources and data sinks via dedicated hardware lines, pins or software programmable registers. Control logic 1302 reads status registers to determine status including but not limited to status of data transfers, size of data transfers, average rate of transfer and connection state.

In an embodiment, control logic 1302 could be programmed to initiate the data transfer between a source (e.g. a USB peripheral) and a sink (e.g. disk drive 108) via pipelined buffer interconnect 300. Furthermore, if a pattern is detected, trigger core 1300 is enabled to control pipelined buffer interconnect 300. In an example, if space is unavailable in a data sink to complete the transfer of data, control logic 1302 instructs pipelined buffer interconnect 300 to cancel the data transfer operation. For example, trigger core 300 monitors a USB data stream sent from a data source (e.g. a USB drive) to a data sink (e.g. disk drive 108) for patterns such as a Media Transport Protocol (MTP) SendObjectInfo operation followed by an MTP SendObject operation which would indicate that an N byte data transfer was in progress. If the pattern for a SendObjectInfo operation is detected followed by the pattern for a SendObject operation, then in an embodiment, control logic 1302 sends a software interrupt to processor 104. Interrupt handler 114 running on processor 104 upon receiving the interrupt may allocate adequate disk space to allow the N byte data transfer to disk 108 or alternatively abort the data transfer.

Figure 14:
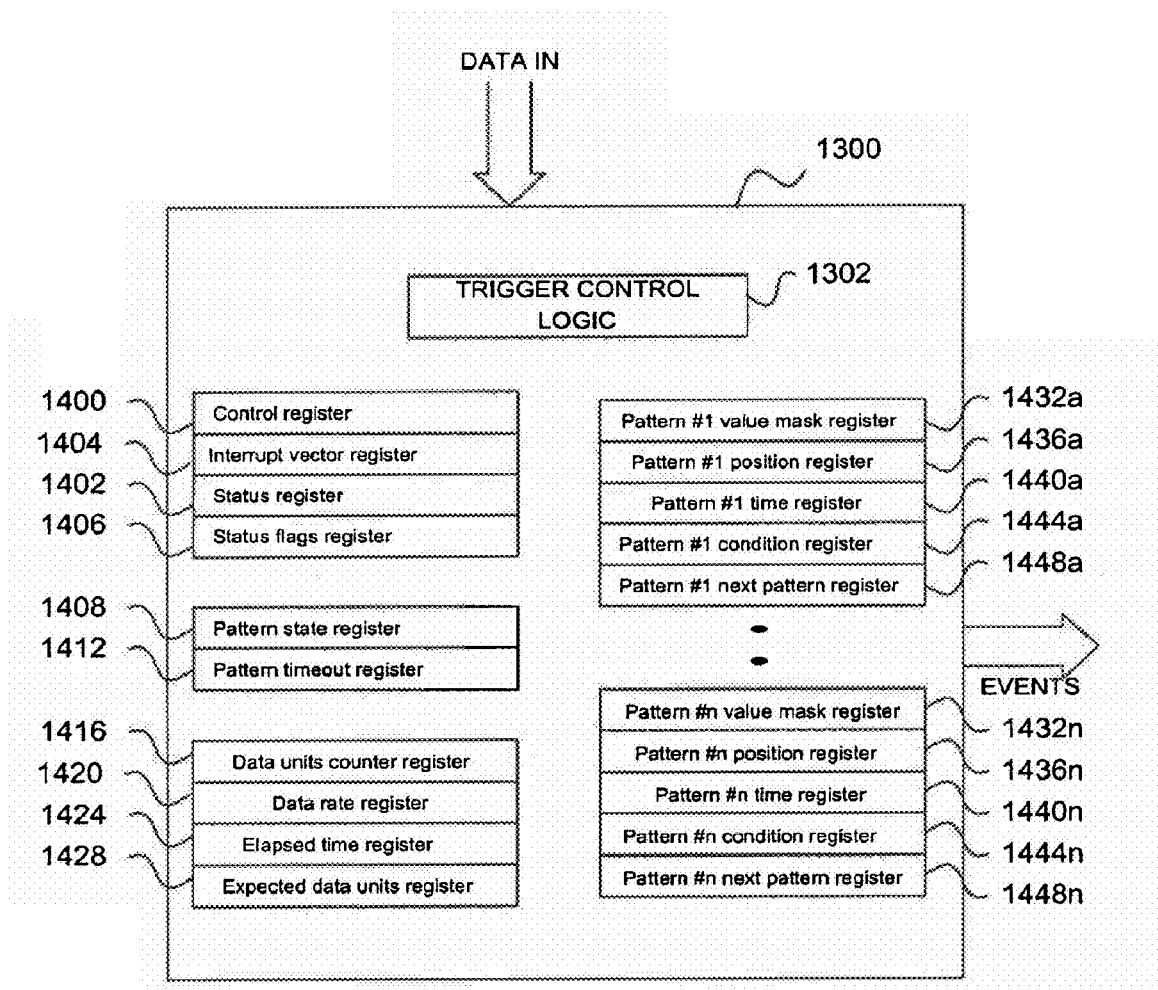
FIG. 14 illustrates a second example of a trigger core according to an embodiment of the invention.

FIG. 14 illustrates a second example of a trigger core according to an embodiment of the invention.

In this embodiment, trigger core 1300 comprises trigger core control logic 1302, control register 1400, status register 1402, interrupt vector register 1404, status flags register 1406, pattern state register 1408, pattern timeout register 1412, data units counter register 1416, data rate register 1420, elapsed time register 1424, expected data units register 1428, pattern mask registers 1432a-n, pattern position registers 1436a-n, pattern time registers 1440a-n, pattern condition registers 1444a-n and next pattern registers 1448a-n. It is to be appreciated by a person of skill in the art that the example register definitions provided herein may be modified based on implementation and design choice for trigger core 1300.

In an embodiment, bits in control register 1400 may be set to control functions of trigger core 1400. For example, a first bit in control register 1400 may be set to turn trigger core 1300 on or off. A second bit in control register 1400 may be set to indicate whether data is to be passed through trigger core 1300. A third bit in control register 1400 may be set to turn pattern detection on or off in trigger core 1300. A fourth bit in control register 1400 may be set to reset counter register 1416. A fifth bit in control register 1400 may be set to reset elapsed time register 1424. A sixth bit in control register 1400 may be set to expected data units register 1428. A seventh bit in control register 1400 may be set to activate or de-activate a trigger on detecting a pattern stored in mask register 1432. An eighth bit in control register 1400 may be set to pause detection of patterns by trigger core 1300. A ninth bit in control register 1400 may be set to resume operation of trigger core 1300. A tenth bit in control register 1400 may be set to reset all registers in trigger core 1300. An eleventh bit in control register 1400 may be set to raise a control line high if a pattern is detected and a trigger is set. A twelfth bit in control register 1400 may be set to send an interrupt if a pattern is detected and a trigger is set. A thirteenth bit in control register 1400 may be set to reset trigger core 1300 if a pattern is detected and a trigger is set.

In an embodiment, bits in trigger core status register 1402 are typically read-only bit fields that indicate status of trigger core 1300. A first bit in status register 1402 indicates pattern detection by trigger core 1300 is disabled. A second bit in status register 1402 indicates whether there is an error in the data stream. A third bit in status register 1402 indicates that trigger core 1300 is ready to detect patterns in a data stream. A fourth bit in status register 1402 indicates detection of errors is temporarily suspended. A fifth bit in status register 1402 indicates whether trigger core 1300 has stalled. A sixth bit in status register 1402 indicates whether trigger core 1300 is disconnected. A seventh bit in status register 1402 indicates whether data is being monitored for patterns. An eighth bit in status register 1402 indicates whether control is active. A ninth bit in status register 1402 indicates whether trigger is in a waiting mode. A tenth bit in status register 1402 indicates whether the trigger is complete. An eleventh bit in status register 1402 indicates whether data unit counter register 1416 stores a value equal to a value in expected data units register 1428. A twelfth bit in status register 1402 indicates whether the value in elapsed time register 1424 is equal to the value in pattern time register 1428. It is to be appreciated that a person of ordinary skill in the art that example bit values are presented herein and may be modified based on implementation of trigger core 1300.

Trigger core status flag register 1406 has additional status code information related to bits set in status register 1402.

Interrupt Vector register 1404 is used to program interrupt vector codes.

Pattern state register 1408 indicates the state of each pattern mask value in registers 1432. For example, a first bit in pattern state register 1408 may indicate whether a first pattern in register 1432a has been detected, a second bit might indicate whether a second pattern in register 1432b has been detected etc.

Pattern timeout register 1412 deactivates trigger core 1300 if patterns in registers 1432 are not detected in a given time period stored in pattern timeout register 1412.

Data units counter register 1416 is used to program an expected number of data units (typically bytes) expected in the data stream. Trigger core 1300 counts data units in the data stream and updates this register with the current count value. In an embodiment, trigger core 1300 is enabled to be programmed to signal an interrupt using a value programmed in interrupt register 1404 when the data units in 1416 match the expected data units in register 1428.

Data rate register 1420 is used to program an expected data rate of a data stream.

Data elapsed time register 1424 is used to store the time for which a data stream has been monitored.

Data units expected register 1428 is used to program an expected number of data units in a data stream.

Pattern value mask register 1432 allows a user to program a mask value of a pattern to be detected in a data stream. Control bits in register 1432 may indicate match-on-any-value or match-on-no-value. Register 1432 may include a bit mask to individually detect certain bit positions and set remaining bit positions to a don't care value. Fir example a mask may be 0x01234zzzz, such that only positions corresponding to 0x01234 are monitored and the bit position where "z" is present are a don't care.

Pattern position register 1436 is used to program a specific position in a data stream to start detecting the pattern programmed in a corresponding mask register 1432. Pattern position register 1436 is programmable to control trigger core 1300 to monitor a data stream for the value in mask register 1432 at an offset from the data units counter register 1416 after this position, before this position or at any position in a data stream.

Pattern time register 1440 allows a user to program the duration for which a pattern stored in a register 1432 is to be detected in the data stream. In an embodiment, a pattern stored in a register 1432 may be detected after a time offset programmed in register 1440 has elapsed or before the programmed time offset has elapsed.

Pattern condition register 1444 is used to program a condition upon which an event is triggered or a "trigger is set." In an embodiment, pattern condition register 1444 may be programmed to trigger an event if a pattern programmed in register 1432 is found in the data stream or is not found in the data stream or is greater than or equal to a value in the data stream or is less than or equal to a value in the data stream.

Next pattern register 1448 is a pointer to a next pattern stored in a register 1432. For example, next pattern register 1448a may point to a mask value stored in pattern value mask register 1432c as being the next pattern to be detected in a data stream. Next pattern register 1448 provides a link to a pattern of the next pattern in a pattern chain. Patterns may thus be chained together to form complex sequential trigger patterns.

Trigger core 1300 may be used to program N mask values of patterns in registers 1432a-n, N pattern positions in registers 1436a-n, N pattern times in registers 1440a-n, N pattern conditions in registers 1444a-n and N next patterns in registers 1448a-n according to an embodiment of the invention.

Trigger core 1300 provides a programmable set of registers as an interface to a configurable set of triggering mechanisms. Trigger core 1300 may be programmed by software using register 1400-1448 to monitor a data stream for specific patterns in the data stream. For example, if a specific pattern in a USB data stream is to be detected, then the pattern may be programmed in a mask register 1432a. If a follow-on-pattern is to be detected within a pre-determined number of bytes or predetermined time-period after detecting the pattern programmed in register 1432a, then the follow-on pattern may be programmed in, for example, register 1432d. Register 1448a is programmed to point to register 1432d. The pre-determined number of bytes or predetermined time-period may be stored in condition register 1444a. The specific pattern in 1432a followed by the pattern in 1432d may indicate a specific USB protocol sequence, and upon detecting the sequence, trigger core 1300 may generate an interrupt to processor 104 using an interrupt value programmed in interrupt vector register 1404. Alternatively, a control line may be set high by trigger core 1300 by setting a bit in control register 1400 as described above.

Next pattern register 1448 allows multiple patterns to be grouped in a composite to generate an interrupt. For example, pattern 1 may be programmed in mask register 1432a and next pattern register 1448a may be programmed to point to pattern 2 programmed in mask register 1432c. An interrupt to processor 104 is sent if pattern 1 is followed by pattern 2 by looking up an interrupt vector code in register 1404. If trigger pattern 1 is not followed by trigger pattern 2, then no interrupt occurs. Condition register 1444 may be programmable with the amount of time and/or data between patterns.

In an example, for the MTP protocol, consider the case where a SendObjectInfo pattern is received followed by a SendObject pattern. If the SendObject pattern is received without a SendObjectInfo pattern preceding the SendObject pattern, then it is a protocol violation and an interrupt is to be triggered. Trigger core 1300 may be programmed to detect a SendObject pattern to be preceded by a SendObjectInfo pattern and to generate an interrupt if this sequence is violated. This would allow this protocol error condition to be detected and prevent an unpredictable data transfer from occurring.

6. Trigger Core Coupled with Pipelined Buffer Interconnect

Figure 15:
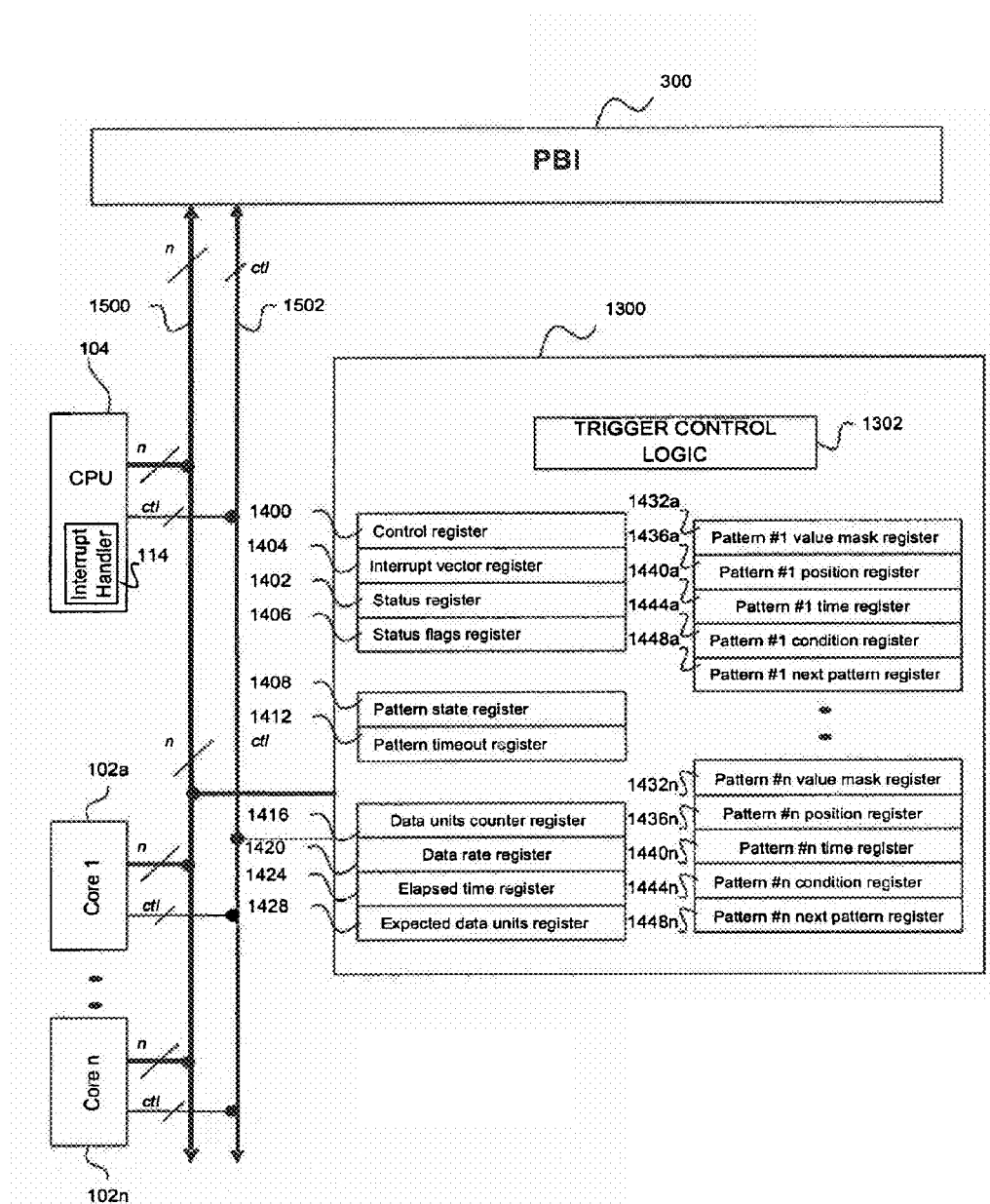
FIG. 15 illustrates trigger core interfaced with various devices according to an embodiment of the invention.

FIG. 15 illustrates a trigger core interfaced with various devices according to an embodiment of the invention.

Trigger core 1300 is coupled to processor 104, cores 102 and pipeline buffer interconnect 300 via data bus 1500 and control line 1502. In this embodiment, trigger core 1300 is enabled to perform the same functions as pipeline buffer interconnect control logic 306 and PBI control and status registers 306, in addition to monitoring data streams for patterns. For example, trigger core 1300 is enabled to detect a pattern that indicates a request for data transfer from a data source (e.g. core 102a) to a data sink (e.g. core 102c). Trigger core 1300 then initiates the data transfer using pipeline buffer interconnect 300. Trigger core 1300 also monitors data transfer on bus 1500 between source core 102a and sink core 102c for user defined patterns. If a user defined pattern is detected then an interrupt may be sent to processor 104 via control line 1502. Interrupt handler 114 running on processor 104 handles the interrupt. In another embodiment, if a user defined event occurs during data transfer, then trigger core notifies pipelined buffer interconnect 300 via control line 1502.

Trigger core 1300 may be used as a general purpose device to interface to any other control logic in a general purpose environment, and is not limited to only being used with the pipelined buffer interconnect 300, processor 104 or cores 102. Trigger core 1300 may be used in general purpose computational device or embedded command and control systems to schedule data transfers and/or monitor data transfers for patterns.

Figure 16:
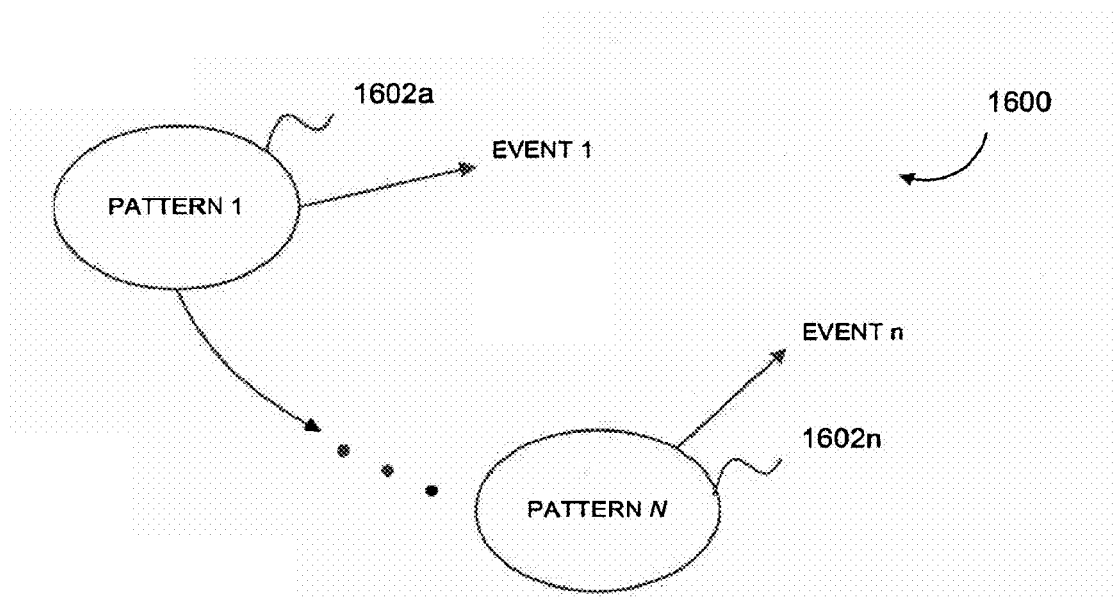
FIG. 16 illustrates an example state diagram according to an embodiment of the invention.

FIG. 16 illustrates an example state diagram 1600 according to an embodiment of the invention.

State machine 1600 may be programmed in trigger core 1300 by programming next pattern registers 1448 and condition registers 1444. By programming next pattern registers 1448 and condition registers (for the transition to the next pattern), multiple states 1602 may be chained together.

In an embodiment, trigger core 1300 may be programmed to trigger an event upon solely detecting a first pattern 1602a. In other embodiments, trigger core 1300 may be programmed to trigger an event only if all of N patterns 1602a-n are detected. In yet another embodiment, trigger core 1300 may be programmed to trigger events upon detecting selected combinations of patterns 1602a-n.

Figure 17:
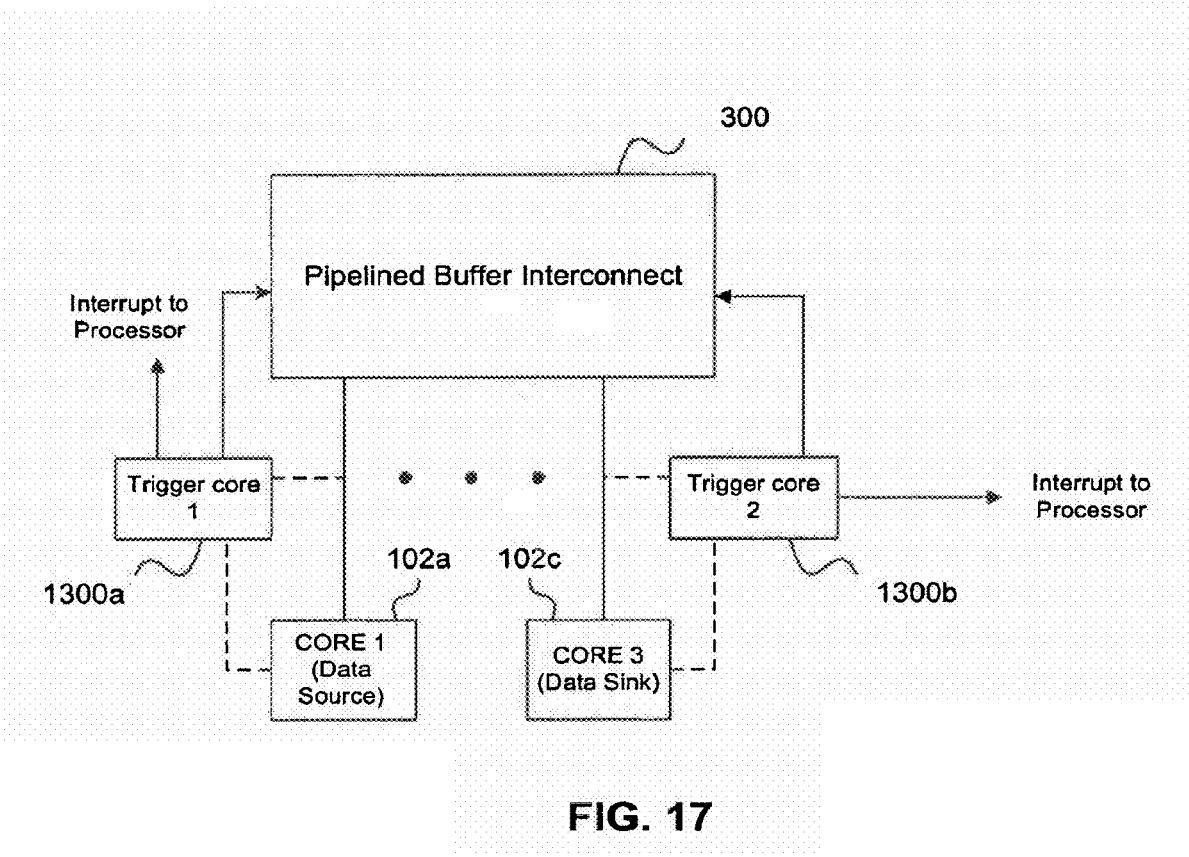
FIG. 17 illustrates example configurations of trigger core according to an embodiment of the invention.

FIG. 17 illustrates example configurations of trigger core 1300 according to an embodiment of the invention.

Trigger core 1300a is coupled to a data source (e.g. core 102a) and to pipeline buffer interconnect 300. Trigger core 1302b is coupled to a data sink (e.g., core 102c) and to pipeline buffer interconnect 300. Trigger core 1300a monitors data transferred from data source to pipeline buffer interconnect 300 for user defined patterns. Trigger core 1300b monitors data transferred from pipeline buffer interconnect 300 to data sink for user defined patterns. In an alternate embodiment, either one of trigger core 1300a or trigger core 1300b is enabled to monitor both the data being transferred from data source to pipeline buffer interconnect 300 and the data being transferred from pipeline buffer interconnect 300 to the data sink for events or patterns.

Trigger core 1300a or trigger core 1300b is enabled to write to control registers 304 in pipeline buffer interconnect 300 to initiate the data transfer from data source to data sink or use control signals to PBI control logic 306 to initiate data transfer from data source to data sink. For example, trigger core 1300a may receive a request from data source (e.g. core 102a) to transfer data to a data sink (e.g. core 102c) using pipeline buffer interconnect 300. Trigger core 1300a requests pipeline buffer interconnect 300 to assign a first buffer and a first bus to the data source. The data source transfers data using an assigned first buffer (e.g. buffer 302c) and first bus (e.g. bus 310c). Upon completion of transfer to the first buffer via the first bus, trigger core 1300 instructs pipeline buffer interconnect 300 to release the first buffer and the first bus and to assign the first buffer and the first bus to the data sink. While data sink reads data from the first buffer and the first bus, trigger core 1300a programs pipelined buffer interconnect 300 to assign a second buffer and a second bus to the data source. While data sink reads data from the first buffer via the first bus, data source transfers data to the assigned second buffer (e.g. buffer 302e) and the assigned second bus (e.g. bus 310e). During the transfer of data from the data source via pipeline buffer interconnect 300, trigger core 1300a monitors the data stream for user defined patterns or pre-programmed error patterns. During the transfer of data from pipelined buffer interconnect 300 to the data sink, trigger core 1300b monitors the data stream for errors and events. Upon detecting an error or an event, trigger core 1300a or trigger core 1300b, depending on where the error occurs, either stops the pipelined buffer interconnect 300 by writing to control registers in pipelined buffer interconnect 300 or via control signals to pipelined buffer interconnect 300. In an alternate embodiment, trigger core 1300a or 1300b upon detecting an event or error sends an interrupt to processor 104. The interrupt causes processor 104 to use interrupt handler 114 to service the error. Trigger core 1300*a* or 1300*b* may use interrupt vector table 308 or interrupt vector register 1404 to send the interrupt to processor 104. In an alternate embodiment, trigger core 1300*a* may indicate the event or error to pipeline buffer interconnect 300 which in turn sends an interrupt to processor 104 using vector codes stored in interrupt vector table 308.

Figure 18:
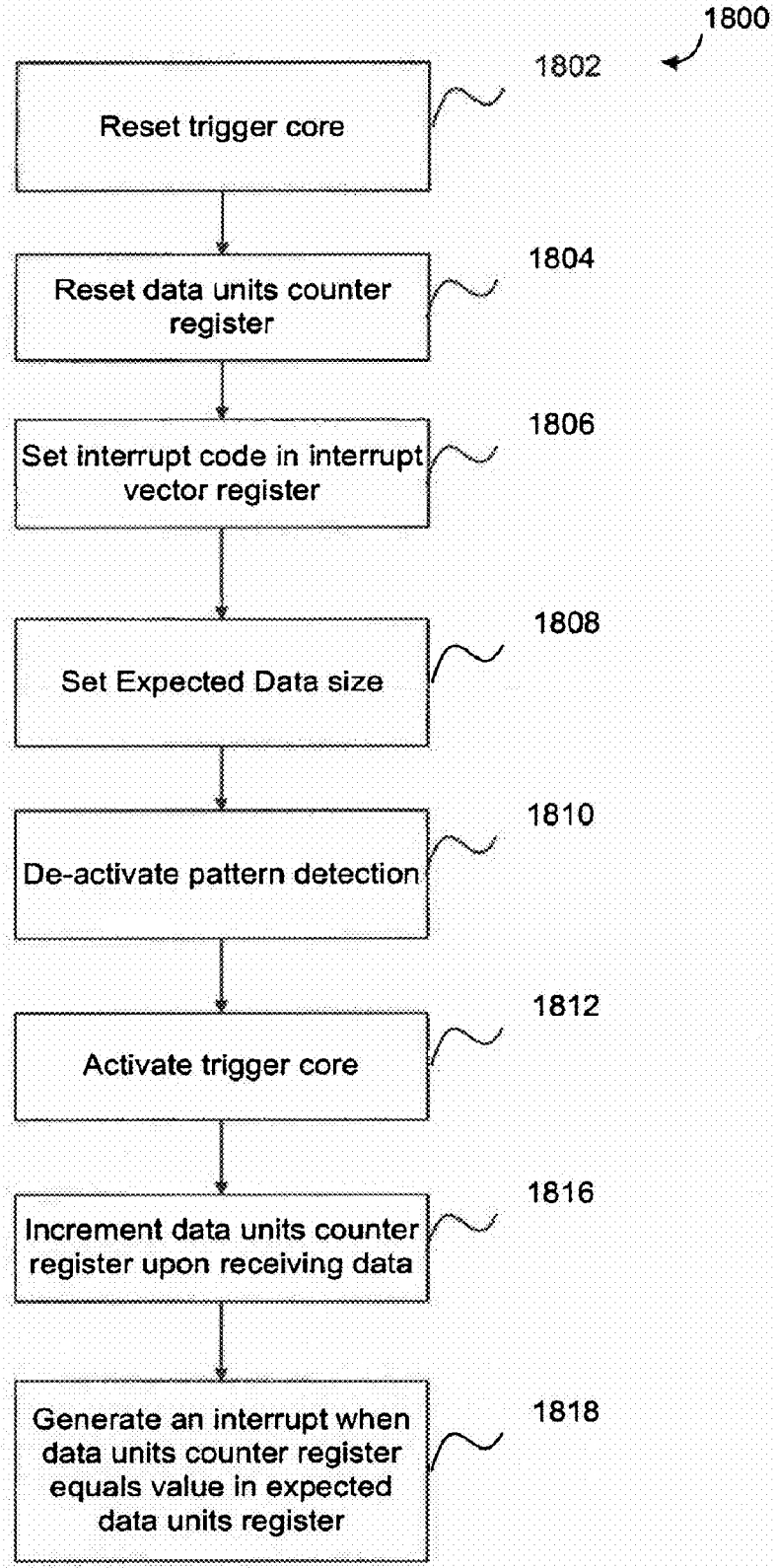
FIG. 18 illustrates a flowchart showing steps to trigger an event upon receipt of predetermined units of data according to an embodiment of the invention.

FIG. 18 illustrates a flowchart showing steps to trigger an event upon receipt of predetermined units of data according to an embodiment of the invention.

In step 1802 the trigger core is reset. For example, trigger core 1300 may be reset by setting a bit in control register 1400. Resetting trigger core 1300 sets trigger core 1300 in an initialized known state.

In step 1804 a data units counter register is reset. For example, data units counter 1416 is reset to zero.

In step 1806 an interrupt code is programmed in an interrupt vector register. For example, an interrupt code is programmed in interrupt vector register 1404.

In step 1808 expected data units to be received is set in an expected data register. For example, expected data units to be received is set in expected data units register 1428.

In step 1810 pattern detection is deactivated. For example, pattern detection is deactivated by setting a bit in control register 1400 to zero.

In step 1812 trigger core is activated. For example, trigger core 1300 is activated by setting a bit in control register 1400.

In step 1816 a data units counter register is incremented when data monitoring is commenced. For example, data units counter register 1416 is incremented upon receiving data.

In step 1818 an interrupt is generated when data units counter register 1416 equals the value stored in expected data units register. For example, an interrupt may be generated using the interrupt code stored in interrupt vector register 1404 when data units counter register 1416 equals the value stored in expected data units register 1428. In another embodiment, trigger core 1300 may send a control signal or write to a control register in pipelined buffer interconnect 300 to indicate receipt of expected data units.

FIGS. 19A-B illustrate a flowchart showing steps to detect a pattern within a predetermined time period according to an embodiment of the invention.

In step 1902 the trigger core is reset. For example, trigger core 1300 may be reset by setting a bit in control register 1400. Resetting trigger core 1300 sets trigger core 1300 in an initialized state.

In step 1904 a data units counter register is reset. For example, data units counter 1416 is reset to zero.

In step 1906 an interrupt code is programmed in an interrupt vector register. For example, an interrupt code is programmed in interrupt vector register 1404.

In step 1908 expected data units to be received is set in an expected data register. For example, expected data units to be received is set in expected data units register 1428.

In step 1910 pattern detection is deactivated. For example, pattern detection is deactivated by setting a bit in control register 1400 to zero.

In step 1912 a pattern mask value is set. For example, a pattern mask value is set in register 1432*a*. An example mask value is 0x11zzzzzz (where "z" is a don't care).

In step 1914 an elapsed time register is reset. For example, elapsed time register 1424 is set to zero.

In step 1916 a pattern time register is set. For example, in trigger core 1300 pattern time register 1440 is set to a predetermined value for which a data stream is to be monitored.

In step 1918 a control line is programmed to go high when a pattern mask value programmed in a pattern value mask register is detected in the data stream. For example, a bit is set in control register 1400 to set received control line as high upon detection of the pattern programmed in pattern mask value register 1432.

The steps of flowchart 1900 are continued in FIG. 19B.

In step 1920 a condition is set for pattern detection. In an example, a condition is set in pattern condition register 1444 such that a trigger is activated when a pattern mask value programmed in register 1432 is detected in the data stream.

In step 1922 trigger core is activated. For example, trigger core 1300 is activated by setting a bit in control register 1400.

In step 1924 elapsed time register is incremented when data monitoring is commenced. For example, elapsed time register 1426 is incremented when trigger core 1300 starts to monitor a data stream for the pattern mask value programmed in pattern mask value register 1432.

In step 1926 it is determined whether there is a match for the pattern programmed in pattern mask register while the value in elapsed time register is less than the value in the pattern time register. For example, the data stream is monitored by trigger core control logic 1302 for a match of the pattern programmed in pattern mask register 1432 while the value in elapsed time register 1424 is less than the value programmed in pattern time register 1440.

In step 1930, if it is determined in step 1926 that the pattern is not detected while the value in the elapsed time register is less than or equal to the value in pattern time register, trigger core is deactivated. For example, if trigger core control logic 1302 determines that the pattern programmed in register 1432 is not detected during the time programmed in pattern time register 1440, then trigger core 1300 is deactivated. In an embodiment, trigger core 1300 is deactivated by trigger control logic 1302 by writing to a control bit in control register 1300.

In step 1928, if is determined in step 1926 that there is a match for the pattern programmed in register 1432 in the data stream, an interrupt is generated. For example, if trigger control logic 1302 determines that there is a match for the pattern programmed in pattern value mask register 1432 in the data stream being monitored, then trigger core control logic 1302 generates an interrupt using the value stored in interrupt vector register 1404. In an alternate embodiment trigger control logic 1302 sends a control signal to indicate detection of the pattern programmed in pattern value mask register 1432. In an alternative embodiment trigger core control logic 1302 sets a bit in pattern state register 1408 to indicate that the pattern mask value stored in register 1432 is detected in the data stream.

In optional step 1932 a control line is set high to indicate detection of the pattern in the data stream. For example, control line 1502 is set high by control logic 1302 to indicate detection in the data stream of the pattern programmed in pattern mask value register 1432.

FIGS. 20A-B illustrate a flowchart showing steps to detect multiple patterns according to an embodiment of the invention.

In step 2002 the trigger core is reset. For example, trigger core 1300 may be reset by setting a bit in control register 1400. Resetting trigger core 1300 sets trigger core 1300 in an initialized state.

In step 2004 a data units counter register is reset. For example, data units counter 1416 is reset to zero.

In step 2006 an interrupt code is programmed in an interrupt vector register. For example, an interrupt code is programmed in interrupt vector register 1404.

In step 2008 expected data units register is reset. For example, expected data units register 1428 is reset to 0.

In step 2010 pattern detection is deactivated. For example, pattern detection is deactivated by setting a bit in control register 1400 to zero.

In step 2012 a first pattern mask value is set. For example, a first pattern mask value is set in register 1432a. An example mask value is 0x11zzzzzz (where "z" is a don't care).

In step 2014 an elapsed time register is reset. For example, elapsed time register 1424 is reset to zero.

In step 2016 a pattern time register is set. For example, in trigger core 1300 pattern time register 1440 is set to a predetermined value (e.g. 30 seconds) for which a data stream is to be monitored for a first pattern.

In step 2018 a condition is set for pattern detection. In an example, a condition is set in pattern condition register 1444 such that a trigger is activated when the first pattern mask value programmed in register 1432a is detected in the data stream being monitored.

In step 2020 a second pattern mask value is set. For example, a second pattern mask value is set in pattern mask register 1432c. For example second mask value is 0x01234zzzz, where "z" is a don't care.

In step 2022 a next pattern register is set to point to the second pattern to be detected in the data stream. For example, next pattern register 1448a is programmed to point to second pattern mask value in register 1432c.

In step 2024 an offset value is set for the second pattern. For example, an offset value (e.g. 10 kb) may be programmed in condition register 1444c such that the second pattern programmed in register 1432c is detected before the offset specified in register 1444c.

In step 2026 a condition is set for detecting the second pattern. In an example, a condition is set in pattern condition register 1444c such that a trigger is activated when the second pattern mask value programmed in register 1432c is detected in the data stream being monitored before the offset value specified in condition register 1444c.

In step 2028 trigger core is activated. For example, trigger core 1300 is activated by setting a bit in control register 1400.

In step 2030 elapsed time register is incremented when data monitoring is commenced. For example, elapsed time register 1426 is incremented when trigger core 1300 starts to monitor a data stream for the first pattern mask value programmed in pattern mask value register 1432a.

In step 2032 it is determined whether there is a match for the first pattern while the value in elapsed time register is less than the value in the pattern time register. For example, the data stream is monitored by trigger core control logic 1302 for a match of the first pattern programmed in pattern mask register 1432a while the value in elapsed time register 1424 is less than the value programmed in pattern time register 1440a.

In step 2036, if it is determined in step 2032 that the first pattern is not detected while the value in the elapsed time register is less than or equal to the value in pattern time register, trigger core is deactivated. For example, if trigger core control logic 1302 determines that the first pattern programmed in register 1432a is not detected during the time programmed in pattern time register 1440a, then trigger core 1300 is deactivated. In an embodiment, trigger core 1300 is deactivated by trigger control logic 1302 by writing to a control bit in control register 1300.

In step 2034, if it is determined in step 2032 that there is a match for the first pattern while elapsed timed register value is less than the value programmed in the pattern time register, then the data stream is monitored for the second pattern before the offset position. For example, trigger core 1300 monitors the data stream for the second pattern programmed in mask register 1432c before the offset position specified in condition register 1444c if it is determined that the first pattern value programmed in register 1432a is found in the data stream being monitored by trigger core 1300 while the value in elapsed time register 1426 is less than the value programmed in pattern time register 1440a.

In step 2038 an interrupt is generated if there is a match for the second pattern in the data stream before the offset position. For example, trigger core control logic 1302 sends an interrupt to processor 104 using the interrupt value stored in register 1404, if the second pattern in register 1432c is detected in the data stream being monitored within the offset specified in condition register 1444c.

7. Example General Purpose Computer System

The following description of a general purpose computer system is provided for completeness. The present invention can be implemented in hardware, or as a combination of software and hardware. Consequently, the invention may be implemented in the environment of a computer system or other processing system. An example of such a computer system 2100 is shown in FIG. 21. The computer system 2100 includes one or more processors, such as processor 2104. Processor 2104 can be a special purpose or a general purpose digital signal processor. The processor 2104 is connected to a communication infrastructure 2106 (for example, a bus or network). Various software implementations are described in terms of this exemplary computer system. After reading this description, it will become apparent to a person skilled in the relevant art how to implement the invention using other computer systems and/or computer architectures.

Computer system 2100 also includes a main memory 2105, preferably random access memory (RAM), and may also include a secondary memory 2110. The secondary memory 2110 may include, for example, a hard disk drive 2112, and/or a interface 2120 to removable storage 2122, and/or a removable storage drive 2114, representing a floppy disk drive, a magnetic tape drive, an optical disk drive, etc. The removable storage drive 2114 reads from and/or writes to a removable storage unit 2215 in a well known manner. Removable storage unit 2115, represents a floppy disk, magnetic tape, optical disk, etc. As will be appreciated, the removable storage unit 2215 includes a computer usable storage medium having stored therein computer software and/or data.

In alternative implementations, secondary memory 2110 may include other similar means for allowing computer programs or other instructions to be loaded into computer system 2100. Such means may include, for example, a removable storage unit 2122 and an interface 2120. Examples of such means may include a program cartridge and cartridge interface (such as that found in video game devices), a removable memory chip (such as an EPROM, or PROM) and associated socket, and other removable storage units 2122 and interfaces 2120 which allow software and data to be transferred from the removable storage unit 2122 to computer system 2100.

Computer system 2100 may also include a communications interface 2124. Communications interface 2124 allows software and data to be transferred between computer system 2100 and external devices. Examples of communications interface 2124 may include a modem, a network interface (such as an Ethernet card), a communications port, a PCM-CIA slot and card, etc. Software and data transferred via communications interface 2124 are in the form of signals 2128 which may be electronic, electromagnetic, optical or other signals capable of being received by communications interface 2124. These signals 2128 are provided to communications interface 2124 via a communications path 2126. Communications path 2126 carries signals 2128 and may be implemented using wire or cable, fiber optics, a phone line, a cellular phone link, an RF link and other communications channels.

The terms "computer program medium" and "computer usable medium" are used herein to generally refer to media such as removable storage drive 2114, a hard disk installed in hard disk drive 2112, and signals 2128. These computer program products are means for providing software to computer system 2100.

Computer programs (also called computer control logic) are stored in main memory 2108 and/or secondary memory 2110. Computer programs may also be received via communications interface 2124. Such computer programs, when executed, enable the computer system 2100 to implement the present invention as discussed herein. In particular, the computer programs, when executed, enable the processor 2104 to implement the processes of the present invention. Where the invention is implemented using software, the software may be stored in a computer program product and loaded into computer system 2100 using raid array 2116, removable storage drive 2114, hard drive 2112 or communications interface 2124.

In an embodiment, one or more of main memory 2105, secondary memory 2110, and removable storages units 2115 and 2122 store processing instructions for directing processor 2104 to negotiate with a device driver of a data sink to transfer data from a data source to a data sink, allocate a first buffer to the data source, lock the first buffer so as to enable only the data source to transfer data to the first buffer, enable the data source to transfer a predetermined amount of data to the first buffer, signal availability of data in the first buffer to the device driver of the data sink, unlock the first buffer, grant access to the data sink to read from the first buffer, allocate a second buffer to the data source, lock the second buffer so as to enable only the data source to transfer data to the second buffer and enable the data source to write data to the second buffer while enabling the data sink to read data from the first buffer, thereby pipelining the data transfer from the data source to the data sink.

In other embodiments, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

8. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method to detect an event in a data stream being transferred from a data source to a data sink using a trigger core, comprising:

setting a pre-determined period of time in a register;

monitoring one or more of a data stream and a control line for a pattern programmed in a mask register; and generating an indication of an error condition, protocol control event or protocol status event in the data stream by sending an interrupt signal to a processor if there is a match for the pattern within the pre-determined period of time.

2. The method of claim 1, wherein the pattern is one or more of a state, condition or event based on data in the data stream and control bits in the control line.

3. The method of claim 1, wherein the event is a function of the protocol under which data is being transferred from the data source to the data sink.

4. The method of claim 1, wherein a first pattern determines a class of an error and a second pattern determines a sub-class of the error.

5. The method of claim 1, wherein a pattern is based on one or more of a predetermined sequence of bits, predetermined number of bits and predetermined time between specific bits.

6. The method of claim 1, wherein the indication is one or more of a data transfer request from the data source to the data sink, start of a frame, end of a frame, specific type of a frame and number of bytes expected.

7. A method, using a trigger core, to generate an interrupt, control signal or status register update indicating receipt of a predetermined size of data from a data source, comprising:

setting a value in an expected data size register to indicate a predetermined data size;

incrementing a counter register upon receiving data from the data source; and generating an interrupt when a value in the counter register equals the value stored in the expected data size register.

8. The method of claim 7, prior to the setting step, comprising:

resetting the trigger core by writing a first value to a control register;

initializing the counter register to zero; and setting an interrupt vector register to a second value.

9. The method of claim 7, prior to the incrementing step, comprising:

de-activating send and receive patterns by setting send pattern state registers and receive pattern state registers to zero; and activating the trigger core by setting a value in a control register.

10. A non-transitory computer readable medium having stored thereon computer executable instructions that, if executed by a computing device, causes the computing device to perform a method to detect an event in a data stream being transferred from a data source to a data sink, comprising:

monitoring one or more of a data stream and a control line for a pattern programmed in a mask register; and generating an indication of an error condition, protocol control event or protocol status event in the data stream by sending an interrupt signal to a processor if there is a match for the pattern;

wherein the pattern is one or more of a state, condition or event based on data in the data stream and control bits in the control line.

11. The non-transitory computer readable medium of claim 10, wherein the event is a function of the protocol under which data is being transferred from the data source to the data sink.

12. The non-transitory computer readable medium of claim 10, wherein the indication is one or more of a data transfer request from the data source to the data sink, start of a frame, end of a frame, specific type of a frame and number of bytes expected.

13. The non-transitory computer readable medium of claim 10, wherein a first pattern determines a class of an error and a second pattern determines a sub-class of the error.

14. The non-transitory computer readable medium of claim 10, wherein a pattern is based on one or more of a predetermined sequence of bits, predetermined number of bits and predetermined time between specific bits.

15. A non-transitory computer readable medium having stored thereon computer executable instructions that, if executed by a computing device, cause the computing device to perform a method to detect an event in a data stream being transferred from a data source to a data sink, comprising:

monitoring one or more of a data stream and a control line for a pattern programmed in a mask register; and generating an indication of an error condition, protocol control event or protocol status event in the data stream by writing to a status register if there is a match for the pattern;

wherein the pattern is one or more of a state, condition or event based on data in the data stream and/or control bits in the control line.

16. The non-transitory computer readable medium of claim 15, wherein the event is a function of the protocol under which data is being transferred from the data source to the data sink.

17. The non-transitory computer readable medium of claim 15, wherein the indication is one or more of a data transfer request from the data source to the data sink, start of a frame, end of a frame, specific type of a frame and number of bytes expected.

18. The non-transitory computer readable medium of claim 15, Wherein a pattern is based on one or more of a predetermined sequence of bits, predetermined number of bits and predetermined time between specific bits.

19. The non-transitory computer readable medium of claim 15, wherein upon polling the status register in the trigger core, a processor stops transfer of data from the data source to the data sink.

20. The non-transitory computer readable medium of claim 15, wherein writing to a control register triggers an event to stop the data transfer from the data source to the data sink.

* * * * *

UNITED STATES PATENT AND TRADEMARK OFFICE
CERTIFICATE OF CORRECTION

| | | |
|---|---|---|
| PATENT NO. | : 8,069,291 B2 | |
| APPLICATION NO. | : 12/782444 | |
| DATED | : November 29, 2011 | |
| INVENTOR(S) | : Scott Krig | |

It is certified that error appears in the above-identified patent and that said Letters Patent is hereby corrected as shown below:

Column 28
Line 20, Claim 18, please replace "Wherein" with --wherein--.

Signed and Sealed this
Fourteenth Day of February, 2012

David J. Kappos
*Director of the United States Patent and Trademark Office*